(12) United States Patent
Schmidt et al.

(10) Patent No.: US 9,516,624 B2
(45) Date of Patent: Dec. 6, 2016

(54) COMMUNICATION TERMINAL, NETWORK COMPONENT, BASE STATION AND METHOD FOR COMMUNICATING

(75) Inventors: Andreas Schmidt, Braunschweig (DE); Maik Bienas, Braunschweig (DE); Ali Koc, Hillsboro, OR (US)

(73) Assignees: INTEL DEUTSCHLAND GMBH, Neubiberg (DE); INTEL CORPORATION, Santa Clara, CA (US)

( * ) Notice: Subject to any disclaimer, the term of this patent is extended or adjusted under 35 U.S.C. 154(b) by 265 days.

(21) Appl. No.: 13/977,055

(22) PCT Filed: Dec. 22, 2011

(86) PCT No.: PCT/EP2011/073883
§ 371 (c)(1),
(2), (4) Date: Jun. 28, 2013

(87) PCT Pub. No.: WO2013/044999
PCT Pub. Date: Apr. 4, 2013

(65) Prior Publication Data
US 2013/0272251 A1    Oct. 17, 2013

Related U.S. Application Data

(60) Provisional application No. 61/542,096, filed on Sep. 30, 2011.

(51) Int. Cl.
*H04W 72/00* (2009.01)
*H04W 72/04* (2009.01)
*H04W 72/12* (2009.01)

(52) U.S. Cl.
CPC ............. *H04W 72/04* (2013.01); *H04W 72/12* (2013.01)

(58) Field of Classification Search
CPC ......... H04W 56/0005; H04W 56/001; H04W 56/002; H04W 56/0025; H04W 56/0075; H04W 28/02; H04W 28/08; H04W 28/22; H04W 28/0289; H04W 16/08; H04W 80/00
USPC ............... 370/230, 252, 254, 277, 310, 324, 370/347–348, 350, 503; 455/13.2, 51.5, 455/424, 453, 502
See application file for complete search history.

(56) References Cited

U.S. PATENT DOCUMENTS

| 6,788,648 | B1 * | 9/2004 | Peterson | G06F 9/5083 370/252 |
| 7,150,017 | B1 * | 12/2006 | Vogl | H04L 12/5693 709/227 |
| 2005/0198200 | A1 * | 9/2005 | Subramanian | H04L 41/50 709/218 |

(Continued)

OTHER PUBLICATIONS

International Search report and Written Opinion Received for PCT Application No. PCT/EP2011/073883 , mailed on Aug. 6, 2012, 5 pages.

(Continued)

*Primary Examiner* — Mohamed Kamara
(74) *Attorney, Agent, or Firm* — Schwabe, Williamson & Wyatt, P.C.

(57) ABSTRACT

According to an aspect of this disclosure, a communication terminal is provided including a first determiner configured to determine, for a software application installed on the communication terminal, a desired communication behavior of the communication terminal for the exchange of data for the software application; a second determiner configured to determine a time for the exchange of data between the communication terminal and a mobile communication network depending on the determined desired communication behavior; and a transceiver configured to communicate with the mobile communication network at the determined time.

20 Claims, 16 Drawing Sheets

(56) References Cited

U.S. PATENT DOCUMENTS

| | | | |
|---|---|---|---|
| 2006/0126531 A1* | 6/2006 | Myojo | H04W 72/1278 370/252 |
| 2009/0225739 A1* | 9/2009 | Yeo | H04W 74/004 370/345 |
| 2010/0115528 A1 | 5/2010 | Piipponen et al. | |
| 2010/0195602 A1 | 8/2010 | Kovvali et al. | |
| 2011/0231361 A1* | 9/2011 | Patchava | G06F 21/50 707/602 |
| 2012/0122448 A1* | 5/2012 | Mueck | H04W 28/24 455/424 |
| 2012/0134268 A1* | 5/2012 | Lopez | H04W 76/022 370/232 |
| 2012/0260331 A1* | 10/2012 | Aaron | H04L 63/02 726/11 |
| 2012/0320791 A1* | 12/2012 | Guo | H04W 52/0212 370/254 |

OTHER PUBLICATIONS

International Preliminary Report and Written Opinion received for PCT Patent Application No. PCT/EP11/73883, issued Apr. 10, 2014, 11 pages.

Office action received for European Application No. 11811543.5, mailed May 9, 2014, 2 pages.

* cited by examiner

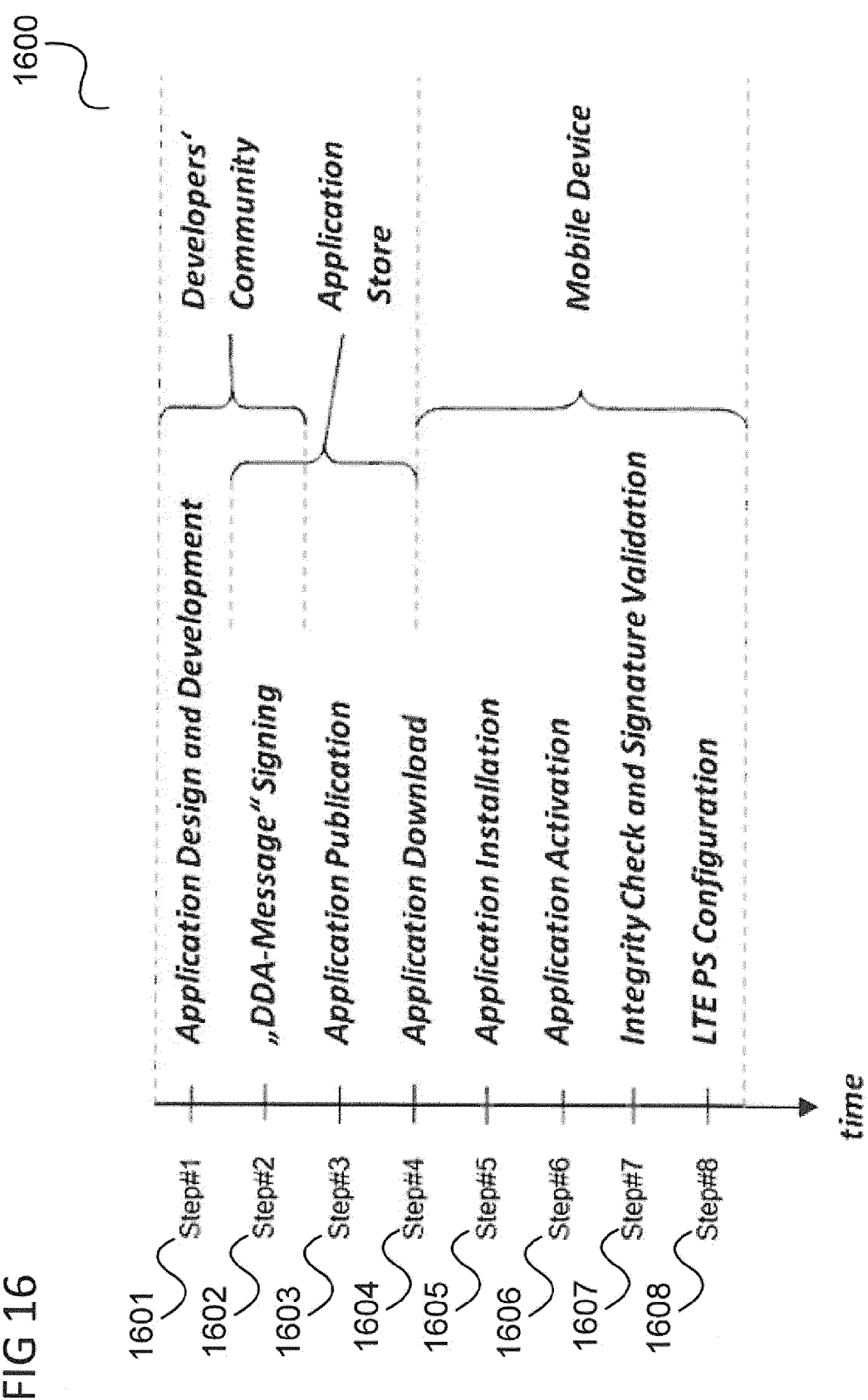

COMMUNICATION TERMINAL, NETWORK COMPONENT, BASE STATION AND METHOD FOR COMMUNICATING

RELATED APPLICATIONS

This application is a national stage entry according to 35 U.S.C. §371 of PCT application No.: PCT/EP2011/073883 filed on Dec. 22, 2011, which claims priority from U.S. Provisional application No. 61/542,096 filed on Sep. 30, 2011.

TECHNICAL FIELD

The present disclosure relates to a communication terminal, a network component, a base station and a method for communicating.

BACKGROUND

On a mobile communication terminal, one or more applications may be installed and running that need to communicate with a mobile communication network for performing their intended functions. Efficient communication of such application-related data is desirable.

SUMMARY

According to an aspect of this disclosure, a communication terminal is provided including a first determiner configured to determine, for a software application installed on the communication terminal, a desired communication behavior of the communication terminal for the exchange of data for the software application; a second determiner configured to determine a time for the exchange of data between the communication terminal and a mobile communication network depending on the determined desired communication behavior; and a transceiver configured to communicate with the mobile communication network at the determined time.

According to another aspect of this disclosure, a network component of a mobile communication network is provided including a determiner configured to determine, for at least one communication behavior of a communication terminal for the exchange of data for a software application, the at least one communication behavior being desired by the software application, a time suggested for the exchange of data for the software application between the communication terminal and the mobile communication network; and a transmitter configured to transmit an indication to the communication terminal specifying that for the at least one communication behavior the determined time is suggested for the exchange of data for the software application between the communication terminal and the mobile communication network.

According to another aspect of this disclosure, a method for communicating with a mobile communication network is provided including determining, for a software application installed on the communication terminal, a desired communication behavior of the communication terminal for the exchange of data for the software application; determining a time for the exchange of data between the communication terminal and the mobile communication network depending on the determined desired communication behavior; and communicating with the mobile communication network at the determined time.

According to another aspect of this disclosure, a base station of a mobile communication network is provided including a transmitter configured to transmit an indication of an expected load of the mobile communication network to a communication terminal.

According to another aspect of this disclosure, a communication terminal is provided including a receiver configured to receive, from a base station of a mobile communication network, an indication of an expected load of the mobile communication network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various aspects are described with reference to the following drawings, in which:

FIG. 16 shows a flow diagram according to an aspect of this disclosure.

DETAILED DESCRIPTION

Figure 1:
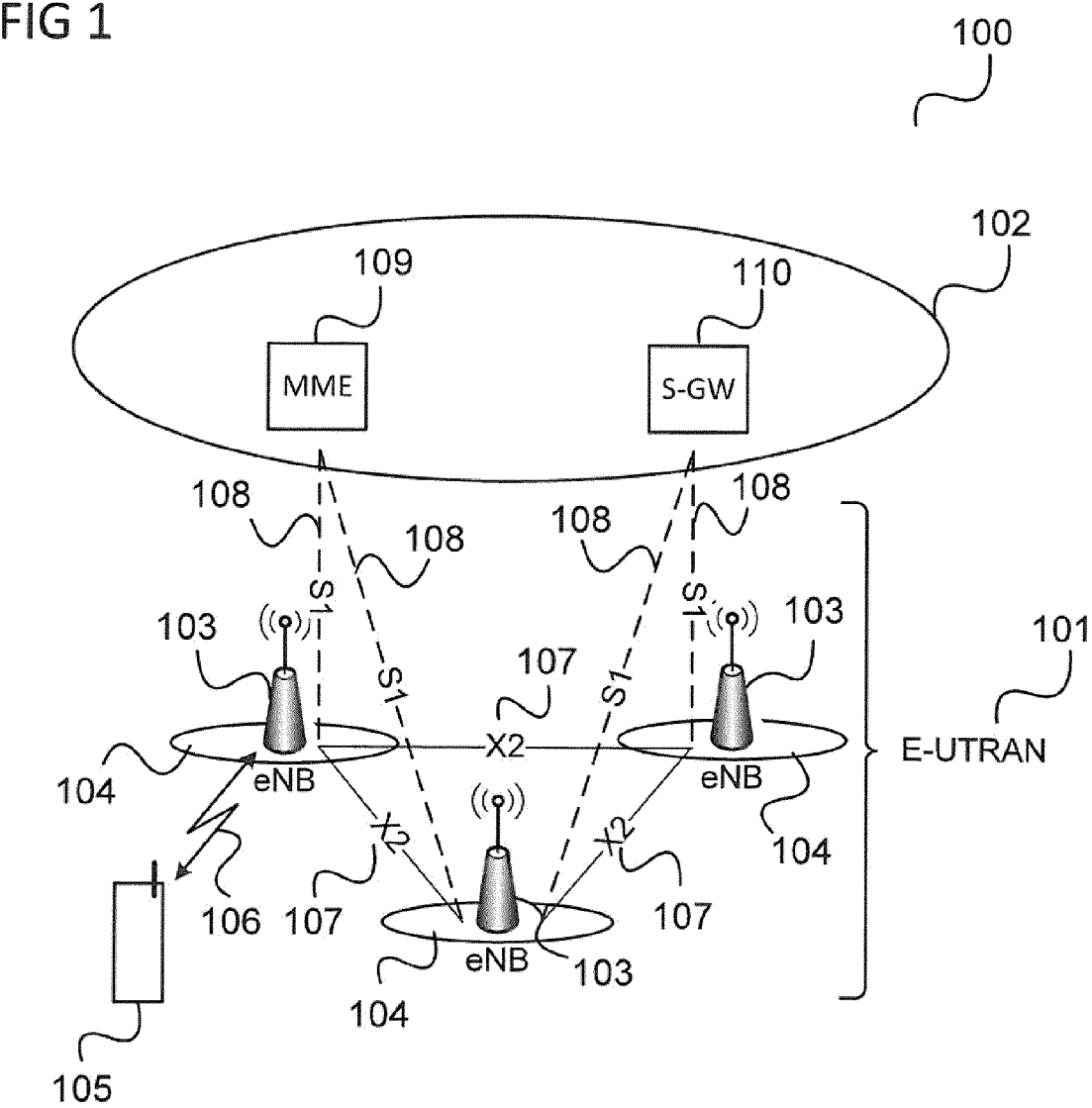
FIG. 1 shows a communication system according to an aspect of this disclosure.

The following detailed description refers to the accompanying drawings that show, by way of illustration, specific details and aspects of this disclosure in which the disclosed embodiments may be practiced. These aspects of this disclosure are described in sufficient detail to enable those skilled in the art to practice the disclosed embodiments. Other aspects of this disclosure may be utilized and structural, logical, and electrical changes may be made without departing from the scope of the disclosed embodiments. The various aspects of this disclosure are not necessarily mutually exclusive, as some aspects of this disclosure can be combined with one or more other aspects of this disclosure to form new aspects.

3GPP (3rd Generation Partnership Project) has introduced LTE (Long Term Evolution) into the Release 8 version of UMTS (Universal Mobile Telecommunications System) standards.

The air interface of an LTE communication system is called E-UTRA (Evolved Universal Terrestrial Radio Access) and is commonly referred to as '3.9G'. In December 2010, the ITU recognized that current versions of LTE and other evolved 3G technologies that do not fulfill "IMT-Advanced" requirements could nevertheless be considered '4G', provided they represent forerunners to IMT-Advanced and "a substantial level of improvement in performance and capabilities with respect to the initial third generation systems deployed already. LTE is therefore sometime also referred to as '4G' (mainly for marketing reasons).

In comparison with its predecessor UMTS, LTE offers an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower). OFDMA/TDMA is a multicarrier multiple access method in which a subscriber (i.e. a mobile terminal) is provided with a defined number of subcarriers in the frequency spectrum and a defined transmission time for the purpose of data transmission. The RF (Radio Frequency) capability of a mobile terminal according to LTE (also referred to as User Equipment (UE), e.g. a cell phone) for transmission and reception has been set to 20 MHz. A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is denoted as a 'resource element'. A communication system that is used according to an aspect of this disclosure and which for example a communication system according to LTE is described in the following with reference to FIG. 1.

FIG. 1 shows a communication system 100 according to an aspect of this disclosure.

The communication system 100 is a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:
  Functions for Radio Resource Management: Radio Bearer Control, Radio Admission Control, Connection Mobility Control, dynamic allocation of resources to UEs 105 in both uplink and downlink (scheduling);
  IP header compression and encryption of user data stream;
  Selection of an MME 109 at UE 105 attachment when no routing to an MME 109 can be determined from the information provided by the UE 105;
  Routing of User Plane data towards Serving Gateway (S-GW) 110;
  Scheduling and transmission of paging messages (originated from the MME);
  Scheduling and transmission of broadcast information (originated from the MME 109 or O&M (Operation and Maintenance));
  Measurement and measurement reporting configuration for mobility and scheduling;
  Scheduling and transmission of PWS (Public Warning System, which includes ETWS (Earthquake and Tsunami Warning System) and CMAS (Commercial Mobile Alert System)) messages (originated from the MME 109);
  CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

A handover may also occur between base stations 103 operating according to different radio access technologies. This is illustrated in FIG. 2.

Figure 2:
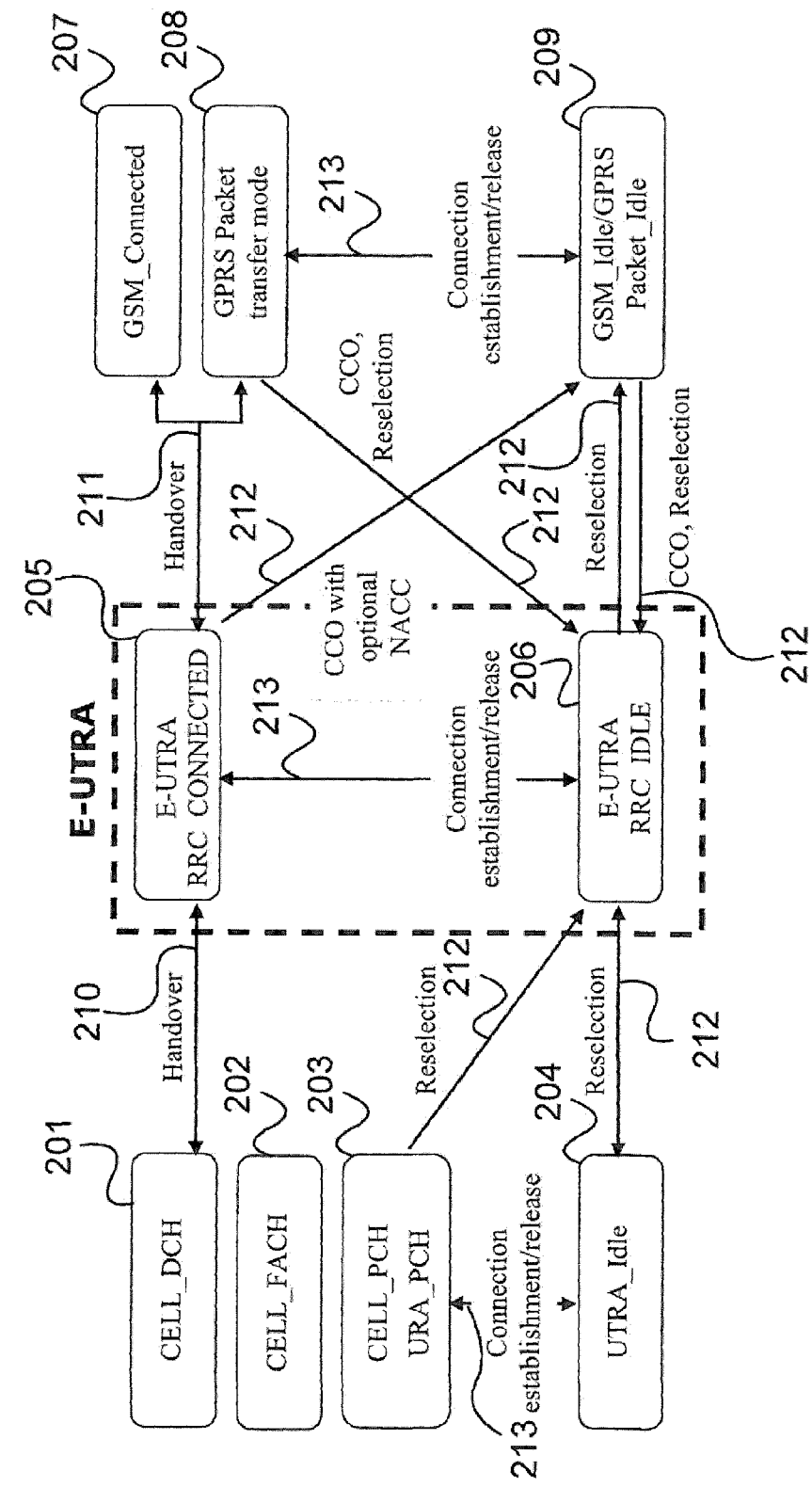
FIG. 2 shows a state diagram according to an aspect of this disclosure.

FIG. 2 shows a state diagram 200 according to an aspect of this disclosure.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. Contrary to UMTS, there are only two E-UTRA RRC states defined for the mobile terminal 105. FIG. 2 can be seen to illustrate the mobility support between E-UTRA, UTRA and GERAN.

According to a first state transition 210, a handover may be carried out between E-UTRA (i.e. a base station 103 operating according to LTE) and UTRAN (i.e. a base station 103 operating according to UTMS).

According to a second state transition 211, a handover may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 213 may occur between states of the same radio access technology, e.g. when a connection is released or a connection is established. The mobile terminal 105 is in RRC_CONNECTED when an RRC connection has been established. If this is not the case, i.e. no RRC connection is established, the mobile terminal 105 is in RRC_IDLE state.

The two RRC (Radio Resource Control) states RRC_IDLE and RRC_CONNECTED in E-UTRA can be characterized as follows:

RRC IDLE
  Mobile terminal specific DRX (Discontinuous Reception) may be configured by upper protocol layers;
  Mobility is controlled by the mobile terminal 105;
  The mobile terminal 105
    may acquire system information (SI);
    monitors a paging channel to detect incoming calls and SI change;
    performs neighboring cell measurements for the cell (re-)selection process.

RRC CONNECTED
A mobile terminal 105 is in RRC_CONNECTED when an RRC connection has been established.
  Transfer of unicast data to/from the mobile terminal 105;
  Mobility is controlled by the radio access network 101 (handover and cell change order);
  The mobile terminal 105 may be configured with mobile terminal specific DRX (Discontinuous Reception) at lower protocol layers.
  The mobile terminal 105
    may acquire system information (SI);
    monitors a paging channel and/or SIB (system information block) Type 1 content to detect SI change;
    monitors control channels associated with the shared data channel to determine if data is scheduled for it;
    performs neighboring cell measurements and measurement reporting to assist the network in making handover decisions;
    provides channel quality and feedback information to the radio access network 101.

According to DRX the PDCCH (Physical Downlink Control Channel) monitoring activity of the mobile terminal 105 is controlled. On the PDCCH, various RNTIs (Radio Network Temporary Identifiers) can be found.

If the mobile terminal 105 is in RRC_IDLE state it is expected to listen to the P-RNTI (the so-called paging indicator) transmitted on the PDCCH which may announce the presence of a paging message on the PDSCH. If DRX is applied in RRC_IDLE, the mobile terminal 105 only needs to monitor one Paging Occasion (PO) per DRX cycle. System Information (SI) broadcast by the base station 103 controls DRX operation by specifying a mobile terminal specific paging cycle in SIB-Type2. (It should be noted that SIB (System Information Block)-Type2 is received by all mobile terminals camping in a given radio cell, but the equation used by a mobile terminal 105 in RRC_IDLE state to calculate its individual Paging Occasion (PO) has as input variable the subscriber's (i.e. mobile terminal's) unique IMSI (International Mobile Subscriber Identity)).

If DRX is configured in RRC_CONNECTED for a mobile terminal 105, the mobile terminal 105 is allowed to monitor the PDCCH (Physical Downlink Control Channel) discontinuously (in order to save energy); otherwise the mobile terminal 105 monitors the PDCCH continuously. The RRC (Radio Resource Control) layer controls DRX operation by configuring timers and parameters, for example as shown in table 1.

TABLE 1 longDRX-CycleStartOffset
The value of longDRX-Cycle is in number of sub-frames. If shortDRX-Cycle is configured, the value of longDRX-Cycle shall be a multiple of the shortDRX-Cycle value. The value of drxStartOffset value is in number of sub-frames.
onDurationTimer
The value in number of PDCCH sub-frames.
drx-InactivityTimer
The value in number of PDCCH sub-frames.
drx-RetransmissionTimer
The value in number of PDCCH sub-frames.
shortDRX-Cycle
The value in number of sub-frames.
drxShortCycleTimer
The value in multiples of shortDRX-Cycle.

Figure 3:
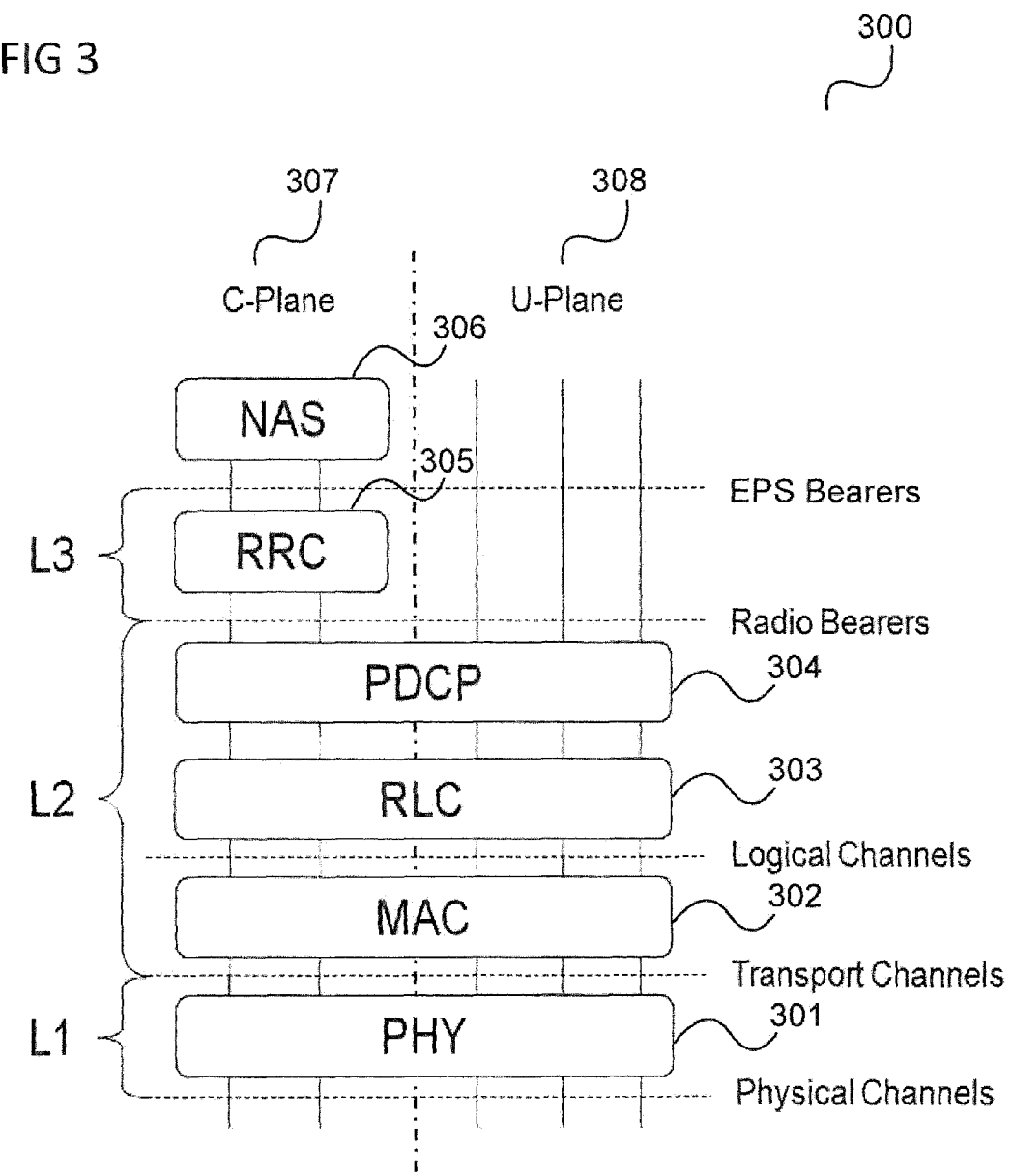
FIG. 3 shows a protocol structure according to an aspect of this disclosure.

The protocols for the C-Plane and the U-Plane of the E-UTRAN 101 according to LTE are illustrated in FIG. 3.

FIG. 3 shows a protocol structure 300 according to an aspect of this disclosure. The LTE air interface (also referred to as Uu interface) is logically divided into three protocol layers. The entities ensuring and providing the functionality of the respective protocol layers are implemented both in the mobile terminal 105 and the base station 103. The bottommost layer is the physical layer (PHY) 301, which represents the protocol layer 1 (L1) according to the OSI (Open System Interconnection) reference model. The protocol layer arranged above PHY is the data link layer, which represents the protocol layer 2 (L2) according to the OSI reference model. In an LTE communication system, L2 consists of plurality of sublayers, namely the Medium Access Control (MAC) sublayer 302, the Radio Link Control (RLC) sublayer 303 and the Packet Data Convergence Protocol (PDCP) sublayer 304. The topmost layer of the Uu air interface is the network layer, which is the protocol layer 3 (L3) according to the OSI reference model and consists of the Radio Resource Control (RRC) layer 305 on the C-Plane 307. On the C-Plane 307, there is further the NAS (Non-Access Stratum) protocol layer 306.

Each protocol layer 301 to 306 provides the protocol layer above it with its services via defined service access points (SAPs). To provide a better understanding of the protocol layer architecture, the SAPs were assigned unambiguous names: The PHY 301 provides its services to the MAC layer 302 via transport channels, the MAC layer 302 provides its services to the RLC layer 303 via logical channels, and the RLC layer 303 provides its services to the RRC layer 305 and the PDCP layer 304 as data transfer as function of the RLC mode, i.e. TM (Transparent Mode), UM (Unacknowledged Mode) and AM (Acknowledged Mode). Further, the PDCP layer 304 provides its services to the RRC layer 305 and the U-Plane 308 upper layers via radio bearers, specifically as Signaling Radio Bearers (SRB) to the RRC 305 and as Data Radio Bearers (DRB) to the U-Plane 308 upper layers. According to LTE a maximum of 3 SRBs and 11 DRBs is currently supported.

The radio protocol architecture is not just split horizontally into the above-described protocol layers; it is also split vertically into the "control plane" (C-Plane) 307 and the "user plane" (U-Plane) 308. The entities of the control plane 307 are used to handle the exchange of signaling data between the mobile terminal 105 and the base station 103, which are required among other for the establishment, reconfiguration and release of physical channels, transport channels, logical channels, signaling radio bearers and data radio bearers, whereas the entities of the user plane 308 are used to handle the exchange of user data between the mobile terminal 105 and the base station 103. According to one aspect of this disclosure, in accordance with LTE, each protocol layer has particular prescribed functions:

- The PHY layer 301 is primarily responsible for i) error detection on the transport channel; ii) channel encoding/decoding of the transport channel; iii) Hybrid ARQ soft combining; iv) mapping of the coded transport channel onto physical channels; v) modulation and demodulation of physical channels.
- The MAC layer 302 is primarily responsible for i) mapping between logical channels and transport channels; ii) error correction through HARQ; iii) logical channel prioritization; iv) transport format selection.
- The RLC layer 303 is primarily responsible for i) error correction through ARQ, ii) concatenation, segmentation and reassembly of RLC SDUs (Service Data Unit);
- iii) re-segmentation and reordering of RLC data PDUs (Protocol Data Unit). Further, the RLC layer 303 is modeled such that there is an independent RLC entity for each radio bearer (data or signaling).
- The PDCP layer 304 is primarily responsible for header compression and decompression of IP (Internet Protocol) data flows, ciphering and deciphering of user plane data and control plane data, and integrity protection and integrity verification of control plane data. The PDCP layer 304 is modeled such that each RB (i.e. DRB and SRB, except for SRBO) is associated with one PDCP entity. Each PDCP entity is associated with one or two RLC entities depending on the RB characteristic (i.e. uni-directional or bi-directional) and RLC mode.
- The RRC layer 305 is primarily responsible for the control plane signaling between the mobile terminal 105 and the base station 103 and performs among other the following functions: i) broadcast of system information, ii) paging, iii) establishment, reconfiguration and release of physical channels, transport channels, logical channels, signaling radio bearers and data radio bearers. Signaling radio bearers are used for the exchange of RRC messages between the mobile terminal 105 and the base station 103.

Figure 4:
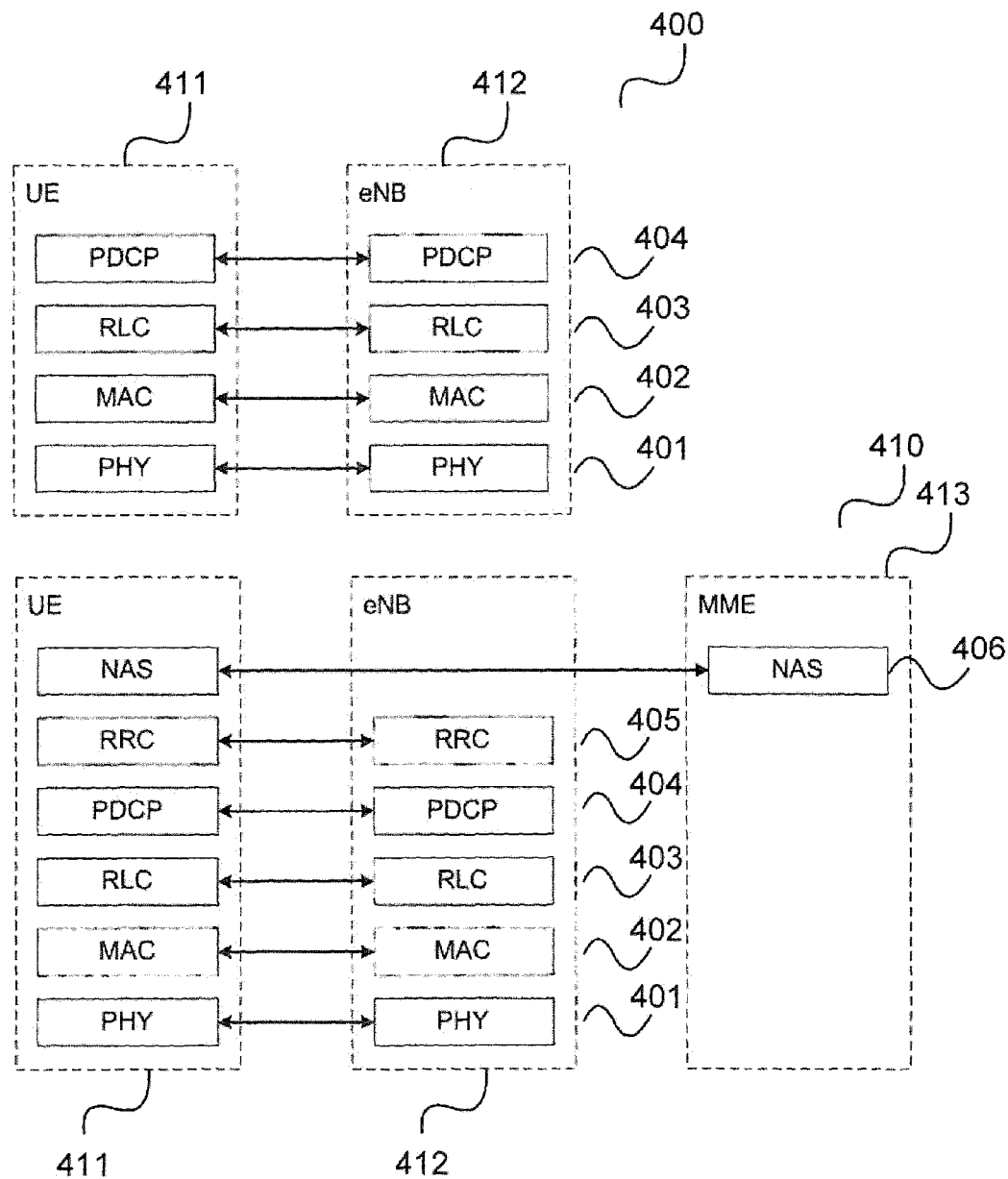
FIG. 4 shows a first protocol structure and a second protocol structure.

Differences between the C-Plane (control plane) 307 and the U-Plane (user plane) 308 according to E-UTRA (LTE) technology are depicted in FIG. 4. The RRC protocol and all lower layer protocols (PDCP, RLC, MAC, and PHY) terminate in the eNB, while the NAS protocol layer 306 terminates in the MME 109 in the EPC 102.

FIG. 4 shows a first protocol structure 400 and a second protocol structure 410.

The first protocol structure 400 corresponds to the U-Plane and the second protocol structure 410 corresponds to the C-Plane.

Analogously to the illustration in FIG. 3, the protocol structures 400, 410 include a physical layer 401, a MAC layer 402, an RLC (Radio Link Control) layer 403, a PDCP layer 404, an RRC layer 405, and a NAS (Non-Access Stratum) protocol layer 406.

In the physical layer 401, the MAC layer 402, the RLC layer 403, the PDCP layer 404, and the RRC layer 405 the terminal points of the communication are the mobile terminal (UE) 411 and the base station (eNB) 412.

In the NAS protocol layer 406, the terminal points of the communication are the UE 411 and the MME 413.

With LTE the UMTS air interface is further optimized for packet data transmission by improving the system capacity and the spectral efficiency. However, the enhancements for LTE technology are not restricted to the air interface. The core network architecture for 3GPP's LTE wireless communication standard is also enhanced. This endeavor is commonly known as SAE (System Architecture Evolution).

SAE refers to the evolution of the GPRS Core Network, with some differences:
- simplified architecture
- all IP (Internet protocol) Network (AIPN)
- support for higher throughput and lower latency radio access networks (RANs)
- support for, and mobility between, multiple heterogeneous RANs, including legacy systems as GPRS, but also non-3GPP systems (e.g. WiMAX)

According to the SAE architecture, the main component is the Evolved Packet Core (e.g. forming the core network of the communication system 100 illustrated in FIG. 1). The Evolved Packet Core (EPC) includes:

A Mobility Management Entity (MME): The MME is the key control-node for the LTE radio access network (E-UTRAN) and, according to LTE, holds the following functions:
NAS signaling;
NAS signaling security;
AS (Access Stratum) Security control;
Inter CN (Core Network) node signaling for mobility between 3GPP access networks;
Idle mode UE Reachability (including control and execution of paging retransmission);
Tracking Area List (TAL) management (for UE in idle and active mode);
PDN GW (Packet Data Network Gateway) and Serving GW selection;
MME selection for handovers with MME change;
SGSN (Serving GPRS (General Packet Radio System) Support Node) selection for handovers to 2G or 3G 3GPP access networks;
Roaming;
Authentication;
Bearer management functions including dedicated bearer establishment;
Support for PWS (which includes ETWS and CMAS) message transmission;
Optionally performing paging optimization.
A Serving Gateway (S-GW): The S-GW holds, according to LTE, the following functions:
The local Mobility Anchor point for inter-eNB handover;
Mobility anchoring for inter-3GPP mobility;
E-UTRAN idle mode downlink packet buffering and initiation of network triggered service request procedure;
Lawful Interception;
Packet routing and forwarding;
Transport level packet marking in the uplink and the downlink;
Accounting on user and QCI (QoS (Quality of Service) Class Identifier) granularity for inter-operator charging;
Uplink and Downlink charging per UE, PDN, and QCI.
A PDN Gateway (P-GW): According to LTE, the PDN Gateway provides connectivity from the UE to external packet data networks by being the point of exit and entry of traffic for the UE. A UE may have simultaneous connectivity with more than one P-GW for accessing multiple PDNs. The P-GW performs policy enforcement, packet filtering for each user, charging support, lawful Interception and packet screening. Another key role of the P-GW is to act as the anchor for mobility between 3GPP and non-3GPP technologies such as WiMAX and 3GPP2 (CDMA 1X and EvDO (Evolution Data Optimized)).

In the following, the network architecture of a communication system (e.g. a 3GPP communication system) with three different Radio Access Networks (RANs) is described with reference to FIG. 5 (for the non-roaming case).

Figure 5:
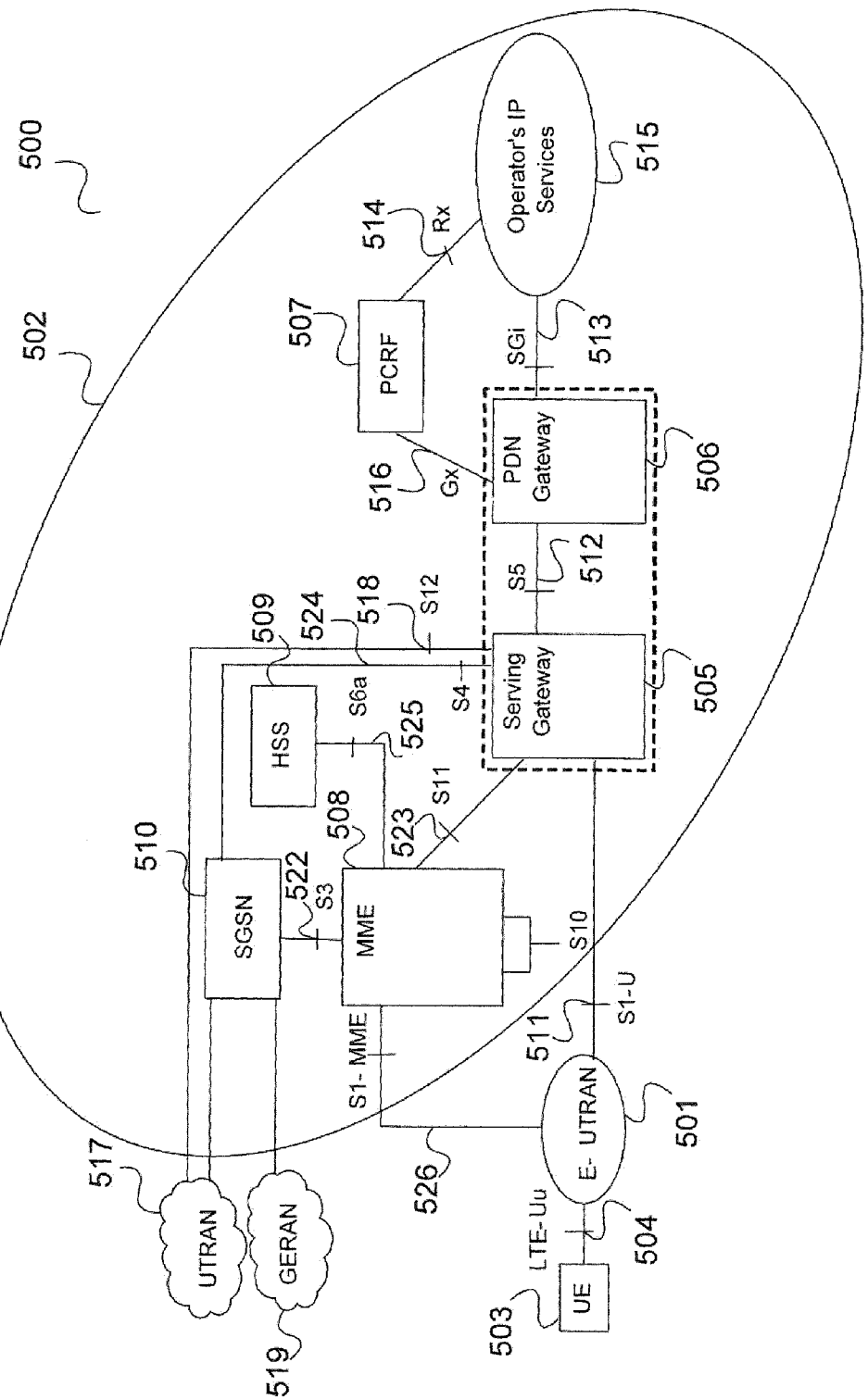
FIG. 5 shows a communication system according to an aspect of this disclosure.

FIG. 5 shows a communication system 500 according to an aspect of this disclosure.

The communication system 500 includes an E-UTRAN 501 and a core network 502.

The communication system 500 corresponds to the communication system 100 wherein in FIG. 1, the E-UTRAN 101, 501 is shown in higher detail while in FIG. 5, the core network 102, 502 is shown in higher detail.

A mobile terminal 503 which may correspond to the mobile terminal 105 may connect to the E-UTRAN 501 by means of an air interface (Uu interface) 504.

The core network 502 includes a Serving Gateway 505, a PDN (Packet Data Network) Gateway 506, a PCRF (Policy and Charging Rules Function) 507, an MME (Mobility Management Entity) 508, and a HSS (Home Subscriber Server) 509, an SGSN (Serving GPRS (General Packet Radio Service) Support Node) 510.

The E-UTRAN 501 exchanges information or commands with the Serving Gateway 505 by means of an S1-U interface 511. The Serving Gateway 505 is coupled to the PDN Gateway 506 by means of an S5 interface 512. The PDN Gateway 506 and the PCRF 507 may access IP (Internet Protocol) services 515 (i.e. may access, for example, corresponding servers) provided by the operator of the mobile communication system 500 by means of an SGi interface 513 and an Rx interface 514, respectively.

The PCRF 507 is coupled to the PDN Gateway 506 by means of a Gx interface 516. The Serving Gateway 505 is coupled by means of an S4 interface 524 with the SGSN 510. The Serving Gateway 505 may further be coupled to an UTRAN (i.e. a radio access network according to UMTS) 517 via a S12 interface 518. The MME 508 is coupled by means of an S6a interface 525 with the HSS 509. The MME 508 is further coupled by means of an S1-MME interface 526 to the E-UTRAN 501.

The SGSN 510 may support legacy access to the UTRAN 517 and/or a GERAN (GSM (Global System for Mobile Communications) EDGE (Enhanced Data Rates for GSM Evolution) Radio Access Network) 519. The SGSN 510 is coupled with the MME 508 via an S3 interface 522. The Serving Gateway 505 is coupled with the MME 508 via an S11 interface 523.

GERAN is also referred to as 2G and 2.5G. UTRAN is a collective term for the NodeBs and Radio Network Controllers (RNCs) which make up the UMTS radio access network. This communications network, commonly referred to as 3G, can carry many traffic types from real-time Circuit Switched to IP based Packet Switched. The UTRAN includes at least one NodeB (i.e. a UMTS base station) that is connected to at least one Radio Network Controller (RNC). An RNC provides control functionalities for one or more NodeBs. A NodeB and an RNC can be the same device, although typical implementations have a separate RNC located in a central location serving multiple NodeBs. An RNC together with its corresponding NodeBs are called the Radio Network Subsystem (RNS). There can be more than one RNS present per UTRAN.

The E-UTRAN 501 is the 3GPP Radio Access Network for LTE (3.9G) that is currently being worked on. The E-UTRA air interface uses OFDMA for the downlink (i.e. for the transmission direction from the base station to the mobile terminal) and Single Carrier FDMA (SC-FDMA) for the uplink (i.e. for the transmission direction from the mobile terminal to the base station). It employs MIMO (Multiple Input Multiple Output) with up to four antennas per (base and user) station. The use of OFDM enables E-UTRA to be much more flexible in its use of spectrum than the older CDMA based systems, such as UTRAN. OFDM has a link spectral efficiency greater than CDMA, and when combined with modulation formats such as 64QAM, and techniques as MIMO, E-UTRA is expected to be considerably more efficient than W-CDMA (Wideband Code Division Multiple Access) with HSDPA (High Speed Downlink Packet Access) and HSUPA (High Speed Uplink Packet Access).

A user of a mobile terminal 105 may install (possibly numerous) third party (software) applications on his device (i.e. on his mobile terminal, e.g. his cell phone) that may require an always-on user experience and typically exhibit exchange of bursty and sporadic packet data. Such a packet data exchange is for example generated by
- User interactions (for instance: chatting, gaming, browsing, etc.),
- Background activities (for instance: status updates, location updates, etc.), or
- Autonomous behaviors (for instance: keep alive messages to check that a link between two devices is operating or to prevent this link from being terminated).

Such applications are typically designed without specific consideration of the demands they place on the radio air interface. Their behavior can therefore for example result in
- a disproportionate amount of control signaling (compared to u-plane traffic),
- a reduced efficiency of the radio access network 101, and
- an increased power consumption of the mobile terminal 105.

3GPP is currently in a process of discussing different simulation setups for Diverse Data Applications (DDAs) to derive typical traffic characteristics that said third party applications may cause.

Aspects of this disclosure which can be seen to address the above issues are described in the following.

Figure 6:
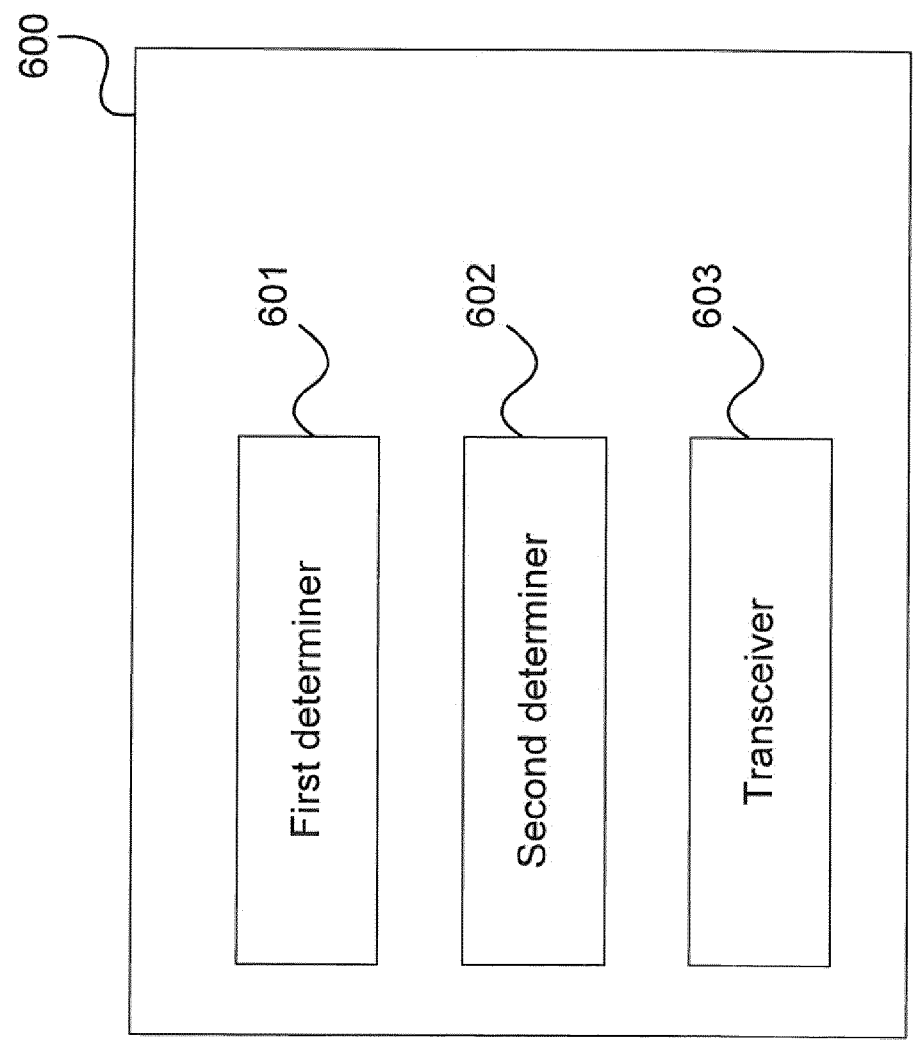
FIG. 6 shows a communication terminal according to an aspect of this disclosure.

FIG. 6 shows a communication terminal 600 according to an aspect of this disclosure.

The communication terminal 600 includes a first determiner 601 configured to determine, for a software application installed on the communication terminal, a desired communication behavior of the communication terminal for the exchange of data for the software application, e.g. for the exchange of data emerging from (or consumed by) the software application.

The communication terminal 600 further includes a second determiner 602 configured to determine a time for the exchange of data between the communication terminal and a mobile communication network depending on the determined desired communication behavior.

Further, the communication terminal 600 includes a transceiver 603 configured to communicate with the mobile communication network at the determined time.

According to one aspect of this disclosure, in other words, a communication terminal acquires information about data transmissions desired (or required) by a software application installed (and/or running) on the communication terminal. For example, the software application may require that once during a certain period, a certain amount of data needs to be transmitted. The information may for example also include the information how long such a required data transmission can be delayed. Exchange of data (e.g. the transmission of data by the communication terminal to a mobile communication network or the reception of data by the communication terminal from a mobile communication network) may be scheduled according to the determined information. In should be noted that an exchange of data between the communication terminal and the mobile communication network does not necessarily include the transmission of data in both directions i.e. the transmission of data from the communication terminal to the mobile communication network and the transmission of data from the mobile communication network to the mobile terminal but may also include the transmission of data in only one direction. In other words, an exchange of data may be understood as including a unidirectional transmission of data as well as a bidirectional communication of data. An exchange of data may also be referred to as a communication of data or a data communication.

An exchange of data for a data application may for example mean an exchange of data emerging from (or consumed by) the software application, i.e. a transmission of data emerging from (e.g. generated by) the software application and/or a reception of data consumed by (e.g. to be processed by) the software application.

According to an aspect of this disclosure, the first determiner is configured to determine the desired communication behavior based on information provided by the software application to the first determiner.

According to an aspect of this disclosure, the first determiner is configured to determine the desired communication behavior based on information about transmission characteristics of the software application.

For example, the first determiner is configured to receive the information about transmission characteristics of the software application from the software application.

The communication terminal may further include a security module configured to check at least one of the integrity and the authenticity of the information about the transmission characteristics.

The information about the transmission characteristics of the software application may be an indication of an application class of the software application.

According to an aspect of this disclosure, the communication terminal further includes a receiver configured to receive, from the mobile communication network, for at least one desired communication behavior of the communication terminal, a suggested time for the exchange of data between the communication terminal and the mobile communication network and wherein the second determiner is configured to determine the time for the exchange of data between the communication terminal and the mobile communication network based on the received suggested time.

According to an aspect of this disclosure, the transceiver is configured to establish a communication connection to the mobile communication network at the determined time.

According to an aspect of this disclosure, the exchange of data for the software application is the exchange of data used by the software application, e.g. the exchange of data emerging from and/or consumed by the software application.

According to an aspect of this disclosure, the exchange of data used by the software application includes at least one of the sending of data generated by the software application and the reception of data to be processed by the software application (in other words, the term "exchange of data" may cover the bi-directional exchange of data in uplink and downlink direction).

According to an aspect of this disclosure, the transceiver is configured to exchange data used by the software application, e.g. transmit and/or receive data used by the software application at the determined time.

According to an aspect of this disclosure, the first determiner is configured to determine the desired communication behavior based on detecting the communication behavior of the software application during a predetermined period.

For example, the first determiner is configured to determine the desired communication behavior as the detected communication behavior.

According to an aspect of this disclosure, the desired communication behavior includes at least one of an amount of data to be transmitted or received by the software application during a certain period of time, a frequency of an occurrence of a desired transmission or reception of data for the software application.

According to an aspect of this disclosure, the first determiner is configured to determine, for each of a plurality of software applications installed on the communication terminal, a desired communication behavior of the communication terminal for the exchange of data for the software application and wherein the second determiner is configured to determine a time for the exchange of data for each of the plurality of software applications between the communication terminal and the mobile communication network depending on the determined desired communication behaviors and wherein the transceiver is configured to exchange data for each of the plurality of software applications with the mobile communication network at the determined time. In other words, according to one aspect of this disclosure the second determiner may coordinate/synchronize the exchange of data for a plurality of applications running on the mobile terminal such that for example the transfer of data for the plurality of applications is performed during the same period, e.g. such that the number of connection set-up attempts can be reduced. Ideally, only one communication connection needs to be established between the communication terminal and the mobile communication network (infrastructure) via which the data for all the applications is transmitted.

According to an aspect of this disclosure, the determined time is a period of time.

According to an aspect of this disclosure, the second determiner is configured to determine a radio cell of the mobile communication network for the exchange of data between the communication terminal and the mobile communication network (if more than one cell is available and/or suitable for communication) based on the desired communication behavior and the transceiver is configured to exchange data (e.g. communicate) with the mobile communication network at the determined time using the determined radio cell.

According to an aspect of this disclosure, the second determiner is configured to receive information about the expected load of the mobile communication network and is configured to determine the time for the exchange of data between the communication terminal and the mobile communication network based on the information about the expected load.

According to an aspect of this disclosure, the second determiner is configured to determine occasions for the exchange of data between the communication terminal and the mobile communication network taking into account at least one of the following:
  information received from the mobile communication network about the expected load.
  information received one or more applications residing on the mobile terminal.

According to another aspect of this disclosure, the second determiner coordinates and reconciles the various diverse application's requirements and needs.

According to an aspect of this disclosure, the information about the expected load received by the second determiner is received from the mobile communication network.

According to an aspect of this disclosure, the information about the expected load received by the second determiner is based measurements gathered by the mobile communication network on at least one interface.

According to an aspect of this disclosure, the measurements collected by the mobile communication network were gathered (in case of LTE) at least on any of the following interfaces:
  the LTE Uu (air interface) between mobile the mobile terminal and the mobile communication network,
  the S1 interface between E-UTRAN and EPC,
  the SG5 interface between S-GW and PDN Gateway, or
  the SGi interface between PDN Gateway and Internet Services.

According to an aspect of this disclosure, the information about the expected load received by the second determiner is based on prediction.

According to an aspect of this disclosure, the information about the expected (predicted) load received by the second determiner is valid for a certain period of time.

According to an aspect of this disclosure, the information about the expected load received by the second determiner is "predicted load over time" (for instance, in form of a timeline) for at least one cell of the mobile communication network (e.g., it may comprise information for the current cell and several neighboring cells at any given location).

Figure 7:
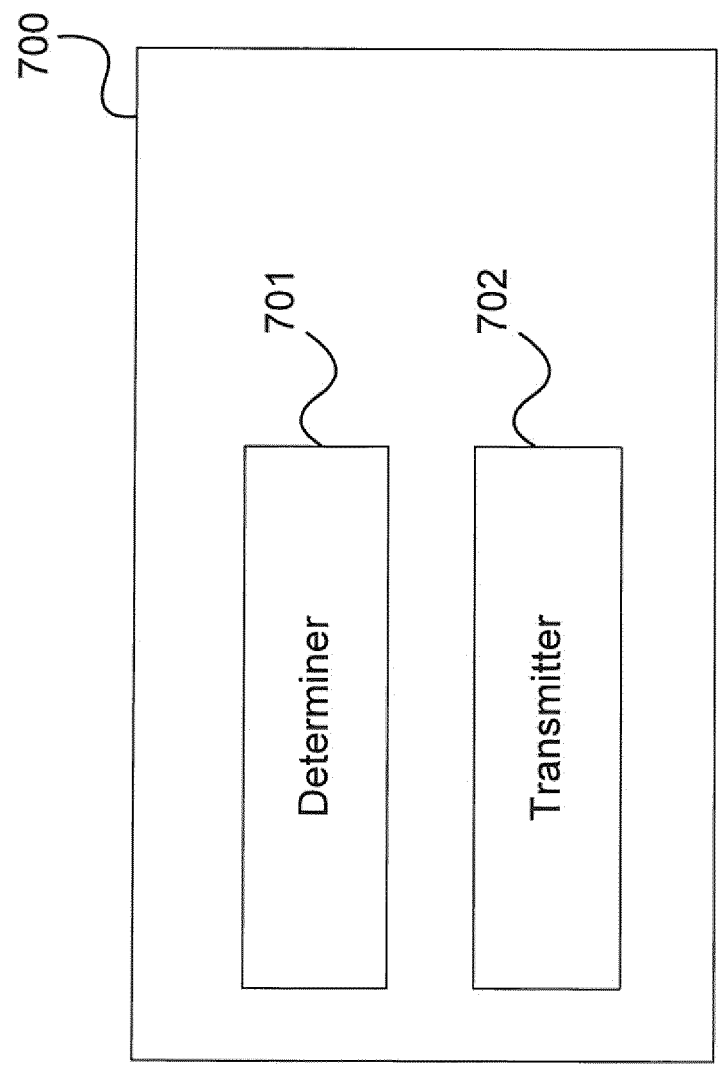
FIG. 7 shows a network component according to an aspect of this disclosure.

The communication terminal 600 may for example communicate with a network component as illustrated in FIG. 7.

FIG. 7 shows a network component 700 according to an aspect of this disclosure.

The network component 700 includes a determiner 701 configured to determine, for at least one communication behavior of a communication terminal for the exchange of data for a software application, e.g. emerging from (or consumed by) a software application residing on the communication terminal (or its counterpart, i.e. the application's server, in the Internet 515), the at least one communication behavior being desired by the software application, a time suggested for the exchange of data for the software application between the communication terminal and the mobile communication network.

The network component 700 further includes a transmitter 702 configured to transmit an indication to the communication terminal specifying that for the at least one communication behavior the determined time is suggested for the exchange of data for the software application between the communication terminal and the mobile communication network.

The network component 700 is for example a node in the RAN (for instance a base station, such as in case of LTE an eNodeB) or a node in the core network (for instance, in case of LTE, a S-GW or a PDN Gateway).

According to one aspect of this dislosure, the determiner is configured to determine the suggested time based on an estimation of the expected load of the mobile communication network.

For example, according to one aspect of this dislosure, the determiner is configured to compile information about the expected load as described above, i.e. to collect measurements on any of the before-mentioned interfaces and to predict load over a certain period of time.

According to one aspect of this dislosure, the determiner is configured to determine a suitable period of time for exchange of application data. The communication terminal 600 may for example carry out a method as illustrated in FIG. 8.

Figure 8:
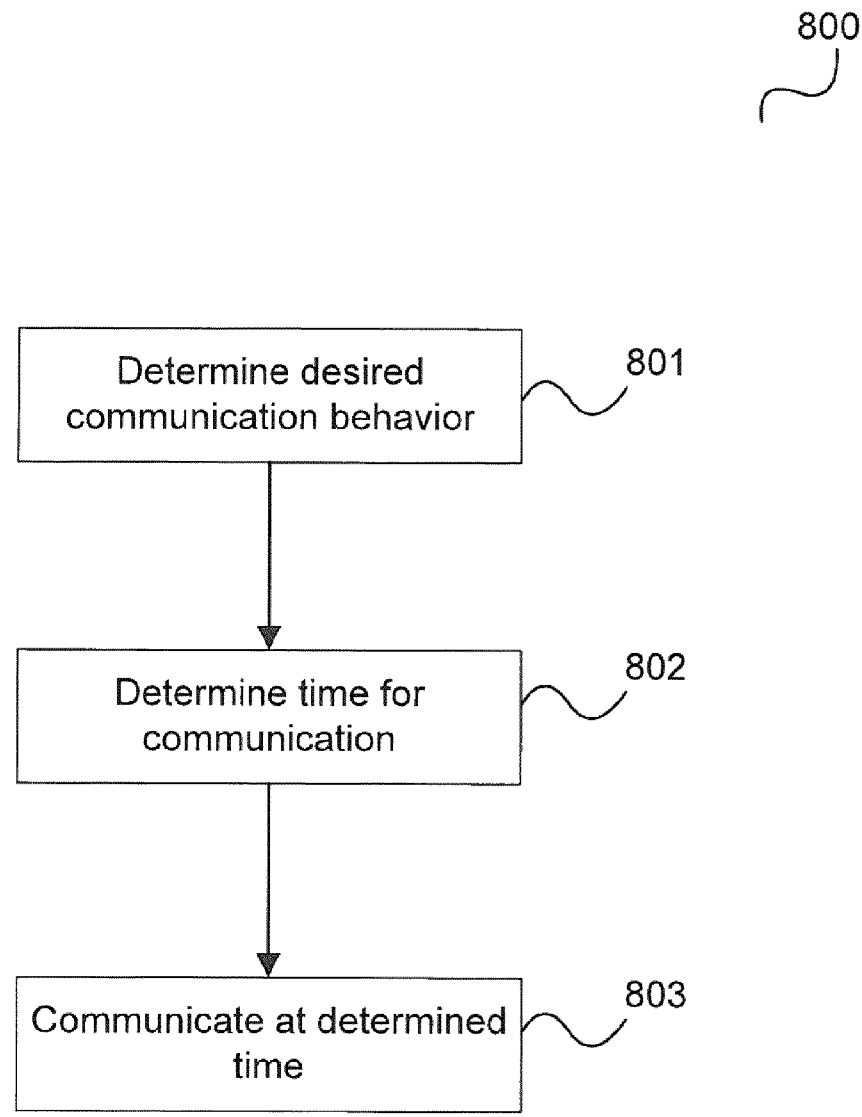
FIG. 8 shows a flow diagram according to an aspect of this disclosure.

FIG. 8 shows a flow diagram 800 according to an aspect of this disclosure.

The flow diagram 800 illustrates a method for communicating with a mobile communication network.

In 801, for a software application installed on the communication terminal, a desired communication behavior of the communication terminal for the exchange of data for the software application is determined.

In 802, a (suitable) time for the exchange of data between the communication terminal and the mobile communication network is determined depending on the determined desired communication behavior. The determination may for example also depend on the expected (predicted) load in the mobile communication network.

In 803, data is exchanged with the mobile communication network at the determined time.

According to another aspect of this disclosure, a method corresponding to the network component 700 is provided.

Figure 9:
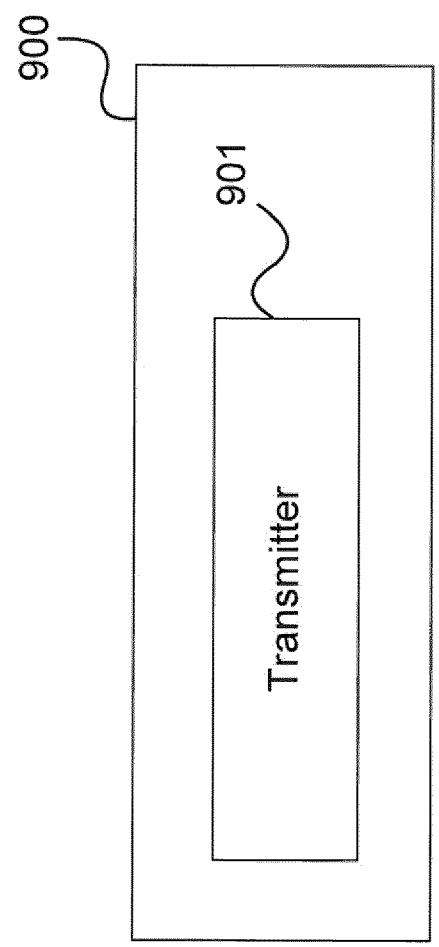
FIG. 9 shows a base station according to an aspect of this disclosure.

According to another aspect of this disclosure, that may be used independently and may also be combined with the aspects of this disclosure described above with reference to FIGS. 6 to 8, a base station as illustrated in FIG. 9 is provided.

FIG. 9 shows a base station 900 according to an aspect of this disclosure.

The base station 900 is a base station of a mobile communication network and a transmitter 901 configured to transmit an indication of an expected (predicted) load of the mobile communication network to a communication terminal.

According to one aspect of this disclosure, in other words, the radio access network of a mobile communication network informs a communication terminal (e.g. a subscriber terminal of the mobile communication network) about the expected network load, e.g. in form of a timeline (e.g. as a table or as an XML file) indicating the expected load during a predetermined period, e.g. during the following one or more hours or the following one or more days or, for example, of the typical load distribution during the 24 hours of a day.

The network load may for example include the load within one or more certain radio cells (e.g. a radio cell in which the communication terminal is located and for example radio cells neighboring that cell) and may thus be seen to include the load on the air interface and may also include the load on other communication paths and components, e.g. of certain components of the mobile communication network such as the load on an interface between the radio access network of the mobile communication network and a core network of the mobile communication network. The indication of the expected network load may for example allow the communication terminal to schedule data transmissions, as for example required by one or more applications running on the communication terminal, for times in which the expected network load is low.

Figure 10:
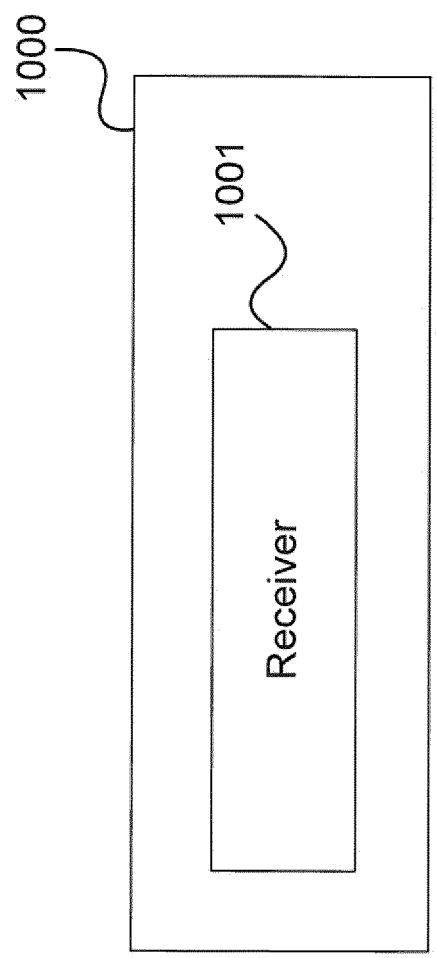
FIG. 10 shows a communication terminal according to an aspect of this disclosure.

The base station 900 for example sends the indication of the expected load to a communication terminal as illustrated in FIG. 10.

FIG. 10 shows a communication terminal 1000 according to an aspect of this disclosure.

The communication terminal 1000 includes a receiver 1001 configured to receive, from a base station of a mobile communication network, an indication of an expected load of the mobile communication network.

It should be noted that aspects of this disclosure described in context of one of the communication terminals are analogously valid for the other communication terminal, the network component, the base station and the method for communicating and vice versa.

According to one aspect of the disclosure, a determiner may be implemented by any kind of a logic implementing entity, which may be special purpose circuitry or a processor executing software stored in a memory, firmware, or any combination thereof. Thus, in an aspect of this disclosure, a determiner may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A determiner may also be a processor executing software, e.g. any kind of computer program, e.g. a computer program using a virtual machine code such as e.g. Java. Any other kind of implementation of the respective functions may also be understood as a determiner in accordance with an alternative aspect of this disclosure.

Aspects of this disclosure are described in the following in more detail.

According to one aspect of this disclosure, two new functional entities are introduced, one functional entity on the mobile terminal side and one functional entity on the network side (also referred to as infrastructure side). Further, according to one aspect of this disclosure, a corresponding messaging framework to negotiate an energy and resource efficient protocol stack behavior taking the transmission requirements of a software application installed on the mobile terminal (e.g. a third party application) into account is introduced. A component on the network side (i.e. a network component) may be an entity in the radio access network, such as a base station and/or an entity in the core network, such as an S-GW or a P-GW. According to one aspect of this disclosure, the messaging framework is utilized to exchange information about the application, control parameters and commands between the two new functional entities over the air interface. This is illustrated in FIG. 11.

Figure 11:
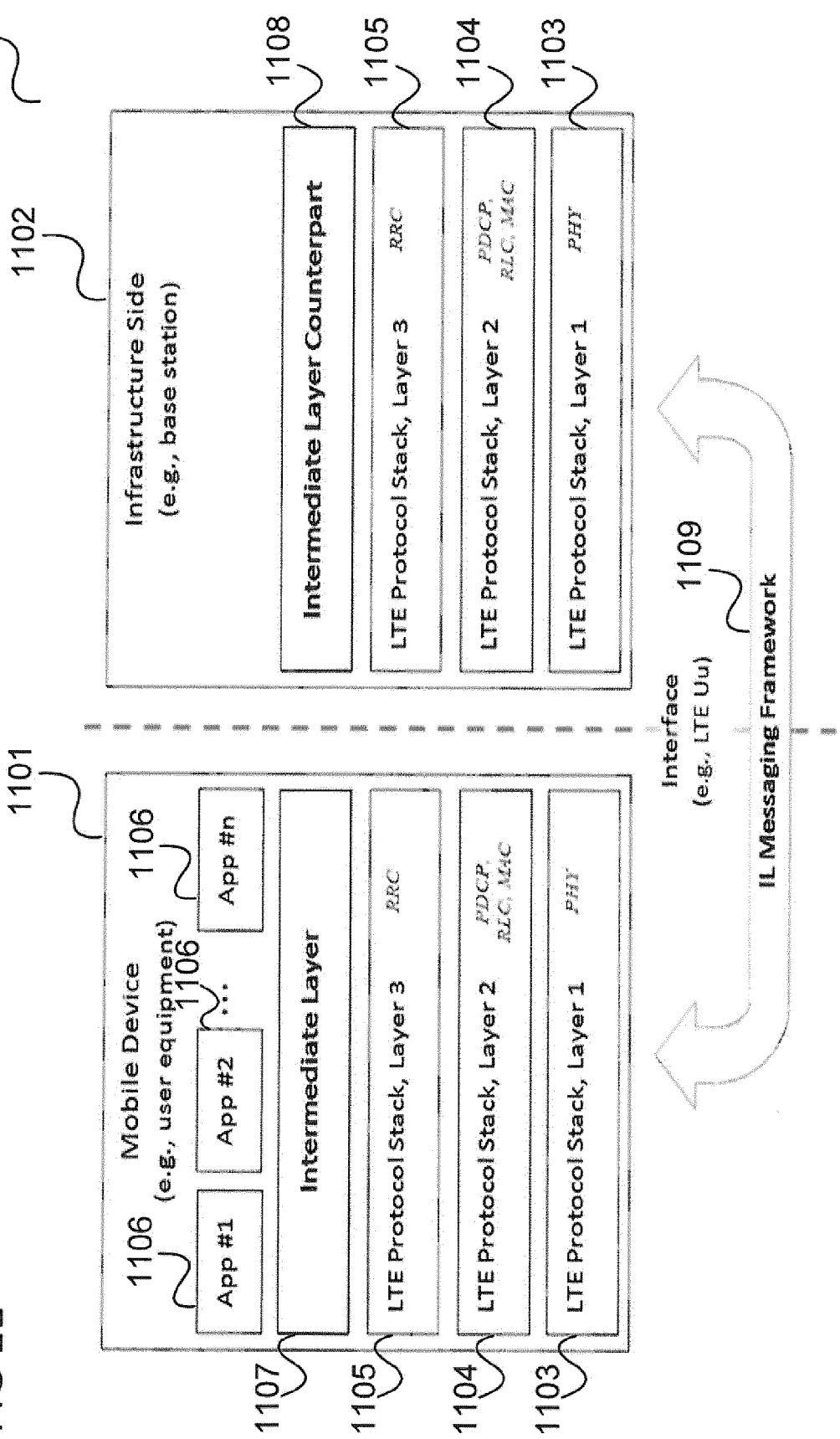
FIG. 11 shows a protocol stack according to an aspect of this disclosure.

FIG. 11 shows a protocol stack 1100 according to an aspect of this disclosure.

The protocol stack 1100 illustrates the protocol stack on the mobile terminal side 1101 and the protocol stack on the network (or infrastructure) side 1102. As explained with reference to FIG. 3, both the protocol stack on the mobile terminal side 1101 (e.g. corresponding to mobile terminal 105 of FIG. 1) and the protocol stack on the network side 1102 (e.g. corresponding to E-UTRAN 101 and/or core network 102 of FIG. 1) includes a layer 1 LTE protocol layer 1103 (including the PHY layer), a layer 2 LTE protocol layer 1104 (including the PDCP layer, the RLC layer and the MAC layer) and a layer 3 LTE protocol layer 1105 (including the RRC layer). One or more software applications are installed and running on the mobile terminal 1101 which are represented by corresponding entities 1106 of the application layer according to the OSI reference model. On the infrastructure side 1102, the application's counterparts (i.e. servers) that may reside in the Internet or in an "IP cloud", such as the "Operator's IP Services Cloud" 515 of FIG. 5, are not shown in FIG. 11 in order to reduce the complexity of the figure.

The protocol layer on the mobile terminal side 1101 includes, between the layer 3 LTE protocol layer 1105 and the application layer, an intermediate layer 1107. Correspondingly, the protocol layer on the network side 1102 includes, between the layer 3 LTE protocol layer 1105 and the application layer, a (counterpart) intermediate layer 1108. The intermediate layer 1107 on the mobile terminal side and the intermediate layer 1108 on the network side can thus be seen to be implemented on top of the LTE protocol stack (including LTE protocol layers of layers 1 to 3). Alternatively, according to another aspect of this disclosure, the functions of the intermediate layer (IL) on the mobile terminal side or the network side or on both sides are implemented as a cross layer entity stretching over all seven layers of the OSI (Open Systems Interconnection) model.

A messaging framework allows communication between the entities of the intermediate layer 1107 on the mobile terminal side and the intermediate layer 1108 on the network side as illustrated by arrow 1109.

The intermediate layer 1107 on the mobile terminal side collects the requirements of the applications installed on the mobile terminal and its counterpart intermediate layer 1108 on the network side is responsible for doing measurements and predictions on RAN load and/or backhaul link load and/or CN load. It compiles a long-term time table for all relevant application classes. This time table (if deemed mature by the intermediate layer 1108 on the infrastructure side) may then be conveyed from the network (e.g. from a base station) over the LTE Uu (air) interface to the mobile terminal where it may be used by the intermediate layer 1107 on the mobile terminal side to control various mobile terminal procedures.

It should be noted that the compilation of the time table on the network side, in other words the evaluation of the measured load on the network side, can be seen to correspond to the network component as described with reference to FIG. 7. According to another aspect of this disclosure, information about the network load, e.g. predictions on RAN load and/or backhaul link load and/or CN load, are transmitted to the intermediate layer 1107 on the mobile side and are evaluated on the mobile side. For example, the intermediate layer 1107 on the mobile terminal side generates a time table indicating for the applications installed on the mobile terminal the times at which the mobile terminal communicates with the mobile communication network to transmit/receive data for the applications. For example, for each of a plurality of application classes a suitable time for communication is determined. This can be seen to correspond to the base station described with reference to FIG. 9 which may transmit the indication of the expected (predicted) network load to the mobile terminal without evaluation (e.g. generation of a time table for the applications) on the network side.

It should further be noted that the mobile terminal, e.g. the communication terminal described with reference to FIG. 6, for example the intermediate layer 1107 on the mobile terminal side, may determine communication timings for the applications installed on the mobile terminal also without (i.e. independent from) load information or a time table received from the network side. For example, the mobile terminal may synchronize the communication times of two or more applications running on it without taking into account the network load. Even then, the number of establishments of communication connections can be reduced since when the communication times of two applications are synchronized, it may be sufficient to establish a communication connection once instead of establish two communication connections at two different times.

With the concept described with reference to FIG. 11 it can be for example be assured that the idle mode (i.e. RRC_IDLE) 206 instead of the connected mode (i.e. RRC_CONNECTED) 205 is used by the mobile terminal as long as possible and unnecessary transmissions are avoided especially during times of heavy cell load. For instance, according to one aspect of this disclosure, over-the-air (OTA) signaling is only initiated a) when enough u-plane data justifies any OTA signaling (this condition is for example applied if communication resources are scarce). This is for example applicable when multiple IM (Instant Messaging) applications are running on the mobile terminal and require/desire the periodic transmission of keep-alive messages since uncoordinated keep-alive messages may prevent the mobile terminal from entering idle mode. According to one aspect of this disclosure, the transmissions of the keep-alive messages are synchronized (e.g. by the intermediate layer 1107 on the mobile terminal side) so that the idle mode can be entered between two instances of data transmission.

b) when enough communication (or processing) resources are free on the infrastructure side (if u-plane data is available). This is for example applicable for software applications that download large amounts of time tolerant data from the mobile communication network, for example a news application that synchronizes once a day with a news server. According to one aspect of this disclosure, it is avoided that such downloads are performed during times of heavy radio cell load (e.g. by taking into account the time table provided by the network side or by taking into account information about the expected network load provided by the network side) and thus it is for example avoided that cell overload is caused. For example, such downloads are scheduled to times with low cell load to prevent radio cell overload.

According to aspects of this disclosure, e.g. in accordance with the concept described above with reference to FIG. 11, the number of connection establishments between the mobile terminal and the communication network can be reduced, radio cell overload can be avoided, communication resources on the precious air interface can be saved and battery power of the mobile terminal can be saved.

According to one aspect of this disclosure, the Intermediate layer 1107, 1108 hosts the following functions:

1) On infrastructure side: load measurement, load estimation, and long-term prediction of load on various interfaces, such as the air interface (e.g. the LTE Uu interface) and/or the backhaul link (e.g. the S1 interface). This is for example a continuous process.

2) On mobile terminal side: classification of data going to/coming from applications running on the mobile terminal into application data classes and/or classification of the applications running on the mobile terminal into application classes.

3) On infrastructure side: time table creation and submission of the time table (or related indications) to the mobile device. The time table for example indicates suitable or unsuitable connection times per application class or application data class. This is either a continuous process or done upon request of the mobile terminal. According to another aspect of this disclosure, information about the expected load in the network is transmitted to the mobile terminal side and the time table is generated on the mobile terminal side.

4) On mobile terminal side: various mobile terminal procedures, such as application data buffering, connection establishment control and DRX control are performed following the guidance included in the time table (or related indications). According to one aspect of this disclosure, the time table is used to influence the mobile terminal's cell re-selection behavior in RRC_IDLE.

Possible classifications of data used by the applications running on the mobile terminal (according to step 2 above) are for example:

Classification of the data according to time constraints, e.g. the classes "urgent data", "delay tolerant data", etc.

Classification of the data according to submission/reception patterns, e.g. "periodic data", "sporadic data", etc.

Classification of the data according to the amount of data, e.g. the classes "large amount of data", "medium amount of data", "small amount of data", etc.

Classification of the data according to the importance of the data, e.g. the classes "meaningful data", "insignificant data", etc.

A classification of data may be equivalently seen as a classification of the application sending/receiving this data. For example, if data has a certain class (e.g. "periodic data"), the application sending/receiving this data may be seen as having the class of an application sending/receiving (or using) this class of data. Accordingly, data class and application class may be used interchangeably according to an aspect of this disclosure.

An architecture of the mobile terminal according to one aspect of this disclosure is described in the following with reference to FIG. 12.

Figure 12:
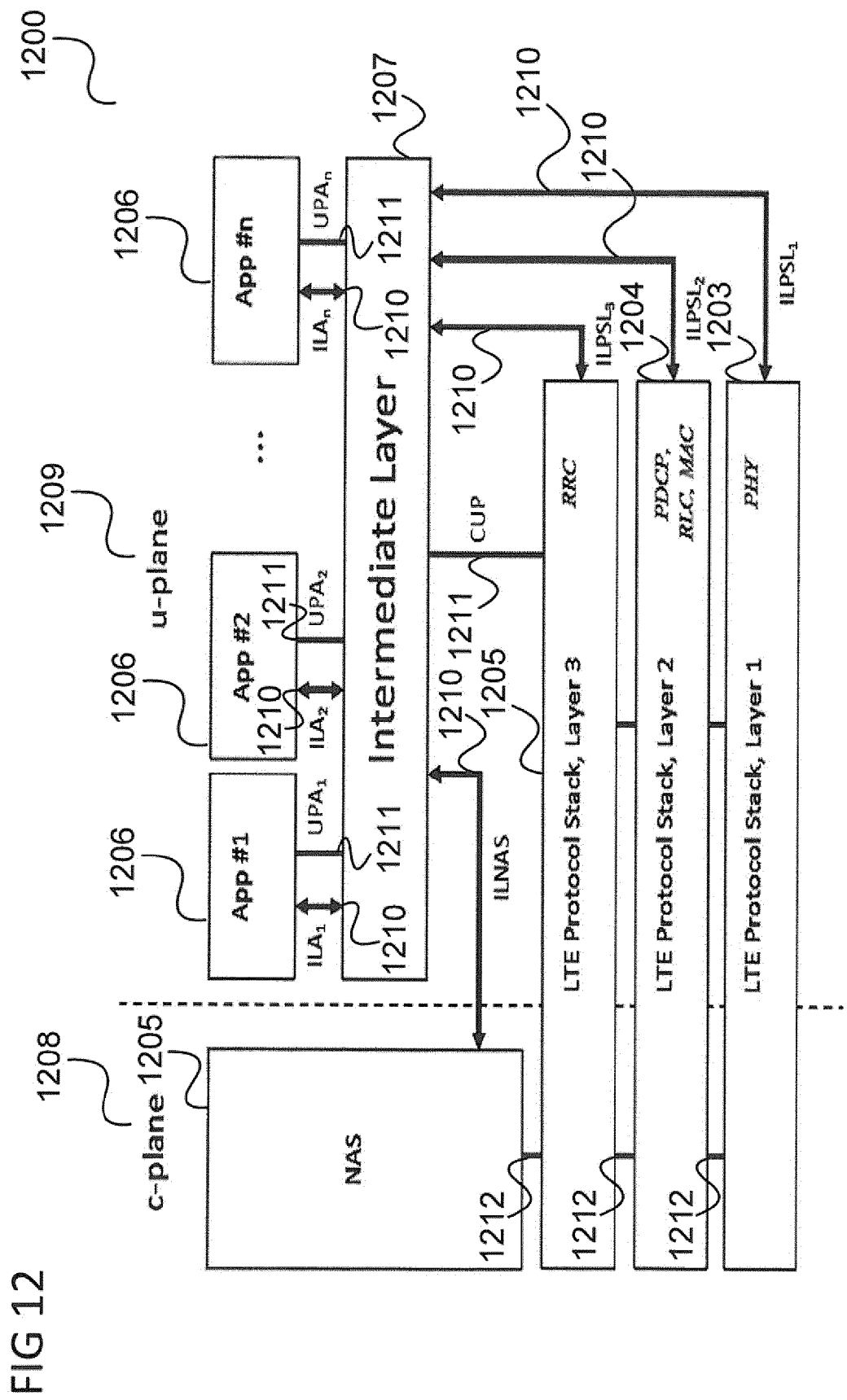
FIG. 12 shows a mobile terminal protocol stack according to an aspect of this disclosure.

FIG. 12 shows a mobile terminal protocol stack 1200 according to an aspect of this disclosure.

Corresponding to the protocol stack on the mobile terminal side 1101 of the protocol stack 1100 shown in FIG. 11, the protocol stack 1200 includes a layer 1 LTE protocol layer 1203 (including the PHY layer), a layer 2 LTE protocol layer 1204 (including the PDCP layer, the RLC layer and the MAC layer), a layer 3 LTE protocol layer 1205 (including the RRC layer), a mobile terminal side intermediate layer 1207 and entities of the application layer 1206 corresponding to applications running on the mobile terminal. Further, as explained with reference to FIG. 3, the protocol stack 1200 includes a NAS layer 1205 in the C-Plane 1208. The intermediate layer 1107, 1207 resides in the U-Plane 1209.

The intermediate layer 1107, 1207 has control interfaces 1210 and user data interfaces (user plane data interfaces) 1211 to other layers (e.g. to other system components). According to one aspect of this disclosure the intermediate layer 1107 includes a data buffer for temporary storage of application data (e.g. in the mobile terminal for delay tolerant uplink submissions). According to one aspect of this disclosure, the intermediate layer controls logical channel prioritization and data buffering in the MAC layer over the ILPSL2 interface. On the c-plane 1208, there are control plane data interfaces 1212.

In the following, an example is described in which it is assumed that two (software) applications were successfully downloaded and installed on the mobile terminal by the user and are running on the mobile terminal. The first application is in this example a weather application that requires periodic access to some data base in the Internet (for instance to collect two updates on the weather forecast per day from a server).

The second application is in this example assumed to be a presence client of a presence service. This is illustrated in FIG. 13.

Figure 13:
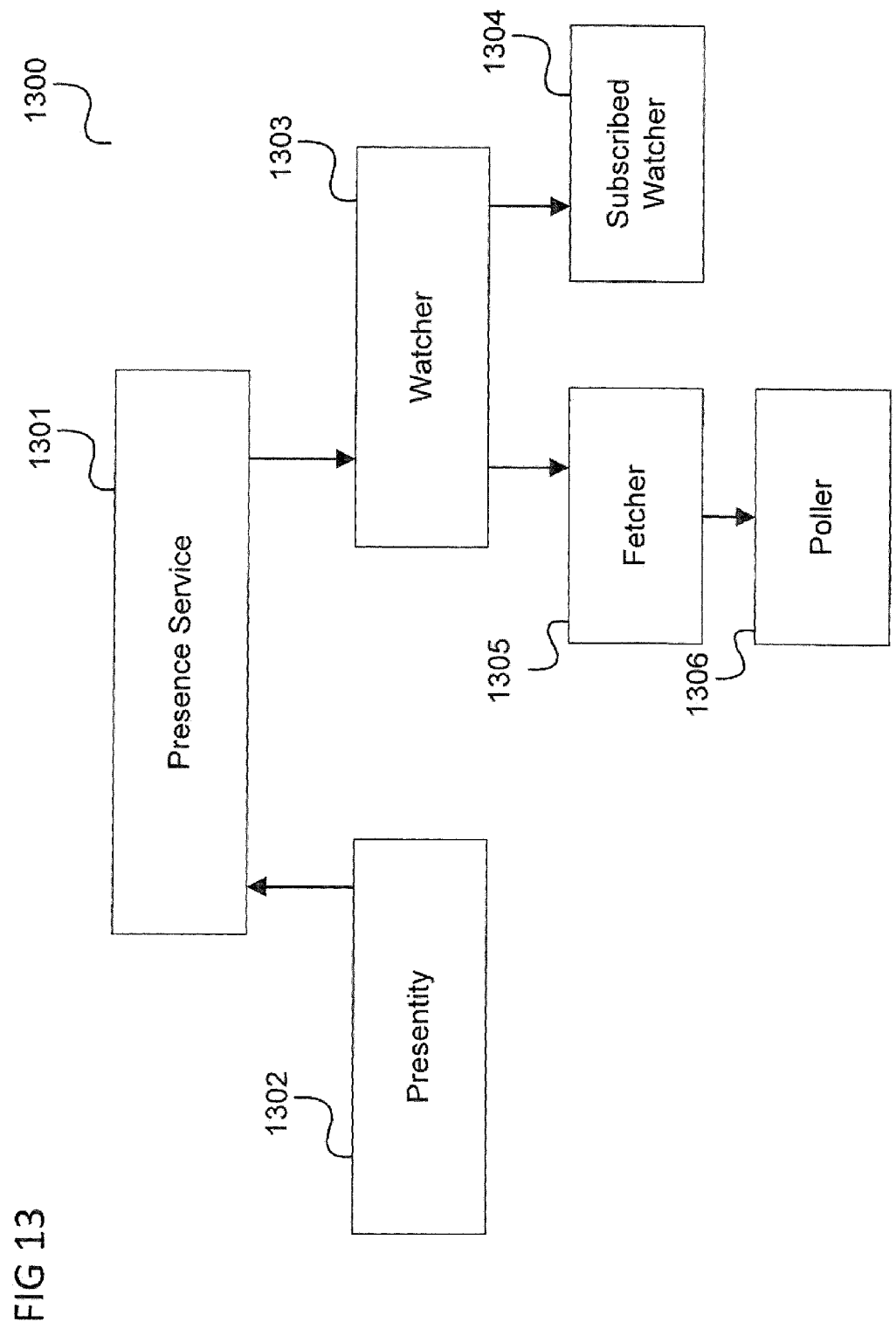
FIG. 13 shows a presence service model according to an aspect of this disclosure.

FIG. 13 shows a presence service model 1300 according to an aspect of this disclosure.

The presence service model 1300 according to an aspect of this disclosure includes a presence service 1301, e.g. provided by a server, which gathers presence information from a presentity 1302. For example, the presence information of the presentity 1302 indicates whether the user of the presentity 1302, e.g. a mobile device, is currently available for a call or does not want to be disturbed. A watcher 1303, e.g. another mobile device, retrieves the presence information from the presence service 1301. The watcher 1303 may be a subscribed watcher 1304 (requests notification of presence information changes from the presence server), a fetcher 1305 (requests current value of presence information from the presence server) or a poller 1306 (requests presence information on a regular basis from the presence server).

For example, the mobile terminal is a presentity 1302 such that the second application has sporadic communication needs in uplink direction, i.e. whenever a certain event (change in status) on the mobile terminal is detected and needs to be reported to the presence server. In this case the second application needs a connection in order to convey the presence information to the presence server.

The second application may also have periodic communication needs in downlink direction caused by regular polls for status updates, e.g. when the mobile terminal is a watcher 1303 and wants to retrieve the presence information of another mobile terminal presence information from the presence server on a regular basis, e.g. acts as a poller 1306. In this case the need for downlink communication comes together with a short uplink communication need (for the corresponding request message for the presence information).

It is assumed that both the first application and the second application are ready for usage, e.g. have been started on the mobile terminal.

For the first application, the intermediate layer 1107, 1207 monitors the traffic caused by the weather application over time on the user data interface between the intermediate layer 1107, 1207 and the first application (e.g. the $UPA_1$ interface in FIG. 12 assuming that the first application corresponds to the entity of the application layer denoted App#1). In detail, the intermediate layer for example monitors the amount of data sourced by and/or destined for the first application. The intermediate layer also monitors the number and circumstances of the connection setup attempts initiated by the weather application over time (e.g. on the $UPA_1$ interface).

For example, after a few days of learning the communication behavior of the first application (which may be seen as the communication behavior of the mobile terminal desired by the first application) the intermediate layer for example derives that the first application causes periodic downlink traffic twice a day (e.g. at around 5 a.m. and at around 2 p.m.) with relatively small amounts of data.

For the second application, the intermediate layer does a similar monitoring (e.g. the $UPA_2$ interface in FIG. 12 assuming that the second application corresponds to the entity of the application layer denoted App#2), for example of the transmitted amount of data, the number of connection setup attempts, etc. caused by the second application. After a few hours of learning, for example, the intermediate layer derives that the second application causes sporadic uplink traffic with very small amounts of data and regular uplink/downlink traffic pairs with a certain time pattern (depending on the selected refresh rate for the function as poller).

In other words, in this example, the intermediate layer 1207 dynamically detects the traffic characteristics of the first application and the second application.

The intermediate layer 1108 on the network side determines the traffic characteristics (e.g. primarily by measuring the traffic load) on all relevant interfaces over a certain amount of time (e.g. a predetermined sufficiently long time period). For example, traffic on the LTE Uu air interface and on the S1 link (i.e. S1 interface) into the core network are used to determine traffic characteristics and to create a time table that may be used by the intermediate layer 1107, 1207 in the mobile terminal to control application data buffering, connection establishment, and DRX.

The intermediate layer 1107 on the mobile terminal side for example tries to find a scheduling for the transmission of data of both the first application and the second application while trying to meet the transmission requirements of both applications. A trade-off may be required between the transmission requirements of the first application, the transmission requirements of the second application and/or the time table.

It should be noted that the transmission requirement of an application may be seen as a communication behavior of the mobile terminal desired by the application since the application may be seen to desire from the mobile terminal to communicate such that the transmission requirements of the application are fulfilled (e.g. a communication connection is established when the application needs to transmit data etc.). Similarly, a communication behavior of an application may be seen as a communication behavior desired by the application of the mobile terminal.

It should further be noted that a time table that has been created may only be suitable for mobile terminals that are served by the same base station, in case mobility aspects (including load in other RAN nodes and on other core network interfaces) were not taken into account. Therefore, according to one aspect of this disclosure, calculation of the load is done in a collaborative effort among many RAN and core network entities that may be dispersed throughout the mobile communication network (e.g. cellular communication network), such as base stations, mobility management entities (MMEs), serving gateways (S-GWs), packet data gateways (P-GWs), etc.

Information about the network load (or an indication of the network load) may generally include time dependent pieces of information and location (or link) dependent pieces of information and it may fall into the responsibility of the merging entity (e.g. the intermediate layer 1108 on the network side or the intermediate layer 1107 on the mobile terminal side) to combine and possibly tag all these pieces of information in a sensible way, e.g. before a time table is conveyed to the mobile terminal (in case that it is created by the intermediate layer 1108 on the network side) and/or before it is used by the mobile terminal.

According to one aspect of this disclosure, the network side provides the mobile terminal with a load prediction for more than one alternative radio cells, links or access points, i.e. the information about the load predication includes information about the location dependency of the load. This is illustrated in FIG. 14.

Figure 14:
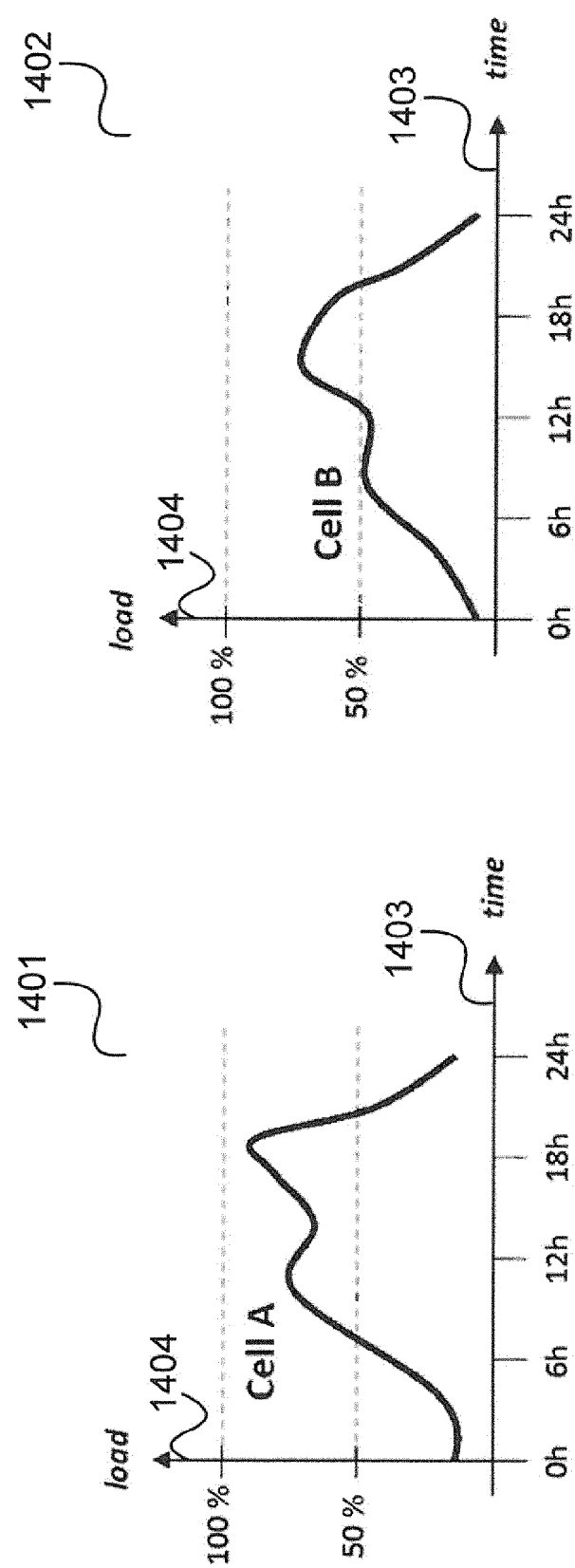
FIG. 14 shows a first load-time diagram and a second load-time diagram.

FIG. 14 shows a first load-time diagram 1401 and a second load-time diagram 1402.

In the first load-time diagram 1401 and the second load-time diagram 1402 time is indicated along a first axis 1403 and load is indicated along a second axis 1404.

For example, the first load-time diagram 1401 indicates the expected load (over 24 hours), e.g. based on the load situation in the past, of a first radio cell (e.g. the number of mobile terminals using the radio cell in a percentage of the maximum mobile terminals that can be served by the radio cell). The second load-time diagram 1402 for example similarly indicates the expected load in a second radio cell, for example neighboring the first radio cell. The mobile terminal is for example provided from the network with information about the time-dependent load in the two radio cells as given by the two load-time diagrams 1401, 1402.

This information about the estimated (or expected) load in two (or more) radio cells can be used to assist the mobile terminal in making time based cell re-selection decisions (e.g., if the mobile terminal resides in RRC_IDLE mode of operation 206 as described in FIG. 2). For example, the mobile terminal may take the load predictions of its current radio cell (i.e. the radio cell it is currently camping on, or using for communication) in combination with a load prediction of one or more alternative radio cells (e.g. neighboring cells) into account, e.g. when it evaluates neighbor cell measurements for making cell re-selection decisions. For instance, the mobile might decide to camp on the second radio cell at noon (corresponding to 12 h on the time axis 1403) when such a behavior is justified by the needs of one or more applications running on the mobile terminal (i.e. is justified by the communication behavior of the mobile terminal desired by the one or more applications) even if the legacy cell selection criteria (i.e. the criteria not taking into account the application needs) would cause the mobile terminal to stay in the first radio cell at noon (since the first radio cell is for example higher ranked for the cell reselection e.g. due to the fact that the radio link quality between the base station operating the first radio cell and the mobile terminal is higher than the radio link quality between the base station operating the second radio cell and the mobile terminal). Such exceptional camping on the second radio cell is for example only done if the radio link quality between the mobile terminal and the base station operating the second radio cell is not much worse compared to the higher ranked first radio cell.

According to an aspect of this disclosure, the data to determine (e.g. calculate) a time table (e.g. measurements of network load) is collected over a long period of time to improve reliability. The time table can therefore be expected to remain valid for a relatively long time. According to an aspect of this disclosure, the time table may be broadcast (e.g. via system information broadcast) to all mobile terminals residing in a certain radio cell or may be sent to a mobile terminals using a dedicated bearer (i.e. using a dedicated communication connection) upon request by the mobile terminal Once the (at least one instance of a) time table is received from the network, the intermediate layer 1107, 1207 in the mobile terminal may start working to accommodate the transmission and reception needs of one or more applications running on the mobile terminal. This may include

- application data buffering (e.g. in a buffer assigned to or included in the intermediate layer 1107 on the mobile terminal side), e.g. until the time of the establishment of a communication connection;
- connection establishment control (for instance via the ILPSL3 interface), e.g. preparing a schedule for the establishments of communication connections;
- DRX control (for instance, via the ILPSL3 interface) and influencing the mobile terminal's cell re-selection behavior.

For example, when the time table indicates that a certain period is well suited for the communication of data that does only allow little delay in the transmission, the mobile terminal may schedule the establishment of a communication connection for the transmission of this data into this period.

According to a further example, two applications were successfully downloaded and installed on the mobile terminal by the user. The first application of these two applications is assumed to be an instant messaging client that requires sporadic exchange of relatively small data packages in both uplink and downlink direction while the user is engaged in a conversation. Regardless of the state of conversation, the instant messaging client is assumed to also submit some very small and predictable keep alive messages (either to check whether the link between the two peers is still operating or to prevent the link from being terminated).

The second application of the two applications is assumed to be a real-time sports application that receives many small updates on events that take place in the matches for selected leagues during game days.

It is assumed that both applications are ready for usage.

It is assumed that the first application (instant messaging client) after its successful installation informs the intermediate layer 1107, 1207 on the mobile terminal side via a control interface 1210 (e.g. an ILA interface, e.g. the control interface 1210 indicated as $ILA_1$ in case that the first application corresponds to the application layer entity 1206 indicated as App#1) about its class (e.g. "instant messaging client") and/or about its transmission requirements/behavior in detail (e.g. "sporadic traffic source", "sporadic traffic sink", "small amount of data", "delay tolerance=5sec" and so on). In this case the intermediate layer 1207 does not need to monitor the amount and type of data transmitted between the intermediate layer and the application via the user data interface 1211 (e.g. the $UPA_1$ interface). It does not have to count the number of connection setup attempts either. Generally, there is no need of learning about this application's specific traffic characteristics because the application provides information about its transmission requirements.

Similarly, in this example, it is assumed that after its successful installation the second application (sports application) informs the intermediate layer 1107, 1207 about its application class ("real-time sports news ticker") and/or its transmission requirements/behavior in detail (e.g. "sporadic traffic source", "regular traffic sink", "relatively small amounts of data", "delay tolerance=5 min", "only active on Saturday and Sunday afternoon", etc.), for example together with the first submission of u-plane data on its user data interface 1210 to the intermediate layer 1207 (e.g. the interface indicated as $UPA_2$ in FIG. 12 in case that the second application corresponds to the application layer entity 1206 indicated as App#2).

It is assumed that the second application has received information about date and time of a few following relevant sports events in course of a preceding communication session. It indicates to the intermediate layer 1207 the time at which it is becoming active to receive information about the sport events and for how long it plans on remaining in this active state. This indication is for example provided by the second application to the intermediate layer 1207 with the first submission of u-plane data in uplink direction to the intermediate layer 1207. In this case the intermediate layer 1207 can reduce monitoring activity on the user data interface between the intermediate layer 1207 and the second application (e.g. the $UPA_2$ interface) during the inactivity times of the application (i.e. the times in which the application is not in the active state for downloading data) as indicated by the application.

It is assumed that the counterpart intermediate layer 1208 on the network side has determined traffic characteristics on relevant interfaces (e.g. on all relevant interfaces) over a decent amount of time. It is thus ready to create and provide a time table to the mobile terminal. The time table received from the network side is used by the intermediate layer 1207 in the mobile terminal to accommodate the transmission and reception needs (i.e. the transmission requirements) of the application. This may for example include application data buffering (preferably in a buffer assigned to or included in the IL),
connection establishment control (for instance, via the ILPSL3 interface),
DRX control (for instance, via the ILPSL3 interface), and influencing the mobile terminal's cell re-selection behavior.

Alternatively, the intermediate layer 1207 can coordinate (or instruct) data buffering in the mobile terminal's transmission buffer assigned to the MAC layer of the protocol stack (i.e., in layer 2 1204) via the ILPSL2 interface.

According to one aspect of this disclosure, in addition to the static information received from the first application and the second application the intermediate layer 1207 may choose to do some additional traffic monitoring of u-plane data exchanged with the applications via the corresponding user data interfaces 1211.

According to one aspect of this disclosure, system information (SI) broadcast of an LTE communication network is used as a mechanism to provide a time table to a mobile terminal over the air interface (e.g. the LTE Uu interface). A time table for example indicates suitable and/or unsuitable connection opportunities per application class (e.g. DDA-class), or, in other words, suggested communication times (or suggested periods of communication) per application class, possibly also per location, e.g. per radio cell, once the information collected/predicted by the infrastructure counterpart about the network load is deemed mature.

According to another aspect of this disclosure, dedicated signaling is used to provide a time table to a mobile terminal over the air interface (e.g. the LTE Uu interface). In contrast to system information (SI) broadcast described above, dedicated signaling methods allow provisioning of individual time tables to distinct mobile terminals (i.e. a mobile terminal's special need can be taken care of individually by the infrastructure).

However, unexpectedly, temporary events may occur making a time table provided from the network side to a mobile terminal temporarily unfit (i.e. inappropriate) or useless. For instance, a time table may indicate long-term connection opportunities indicating that the time period from 10 p.m. to 4 a.m. of the next day is a good opportunity to set-up a connection for a(n) (set of) application(s) 1106, 1206 of a certain application class (e.g. for delay tolerant applications, such as maintenance reports or none-real time advertising updates, etc.) in radio cell. However, let a motorway be going through the location of the radio cell and let, due to an accident on the motorway, the lanes be filled up with cars. The people in the cars will likely pull out their mobile devices in order to call their family to inform them about their delay in coming home or simply to kill waiting time by browsing the Internet. In other words, all the people waiting in their cars may cause a lot of unexpected traffic (e.g. non DDA-traffic) in the radio cell at a time where according to the time table DDAs are scheduled to do connection set-ups to perform their communication.

According to one aspect of this disclosure, the communication behavior of the mobile terminal as indicated by the time table (e.g. for DDA-related communication) is paused. Specifically, according to one aspect of this disclosure, a mobile terminal is notified when a time table does not fit temporarily and should not be used. According to one aspect of this disclosure, the mobile terminal is further notified about the predicted duration of the deviation from the time table (in other words the abnormal service behavior) in the location (e.g. radio cell). According to one aspect of this disclosure, the start and stop times of deviation from the time table is explicitly signaled.

According to one aspect of this disclosure, the mobile communication network (e.g. a base station) sends out a deviation notification (DN) to the mobile terminal. The intermediate layer 1207 in the mobile terminal may, when it receives a deviation notification, deviate from the schedule according to the time table (e.g. its normal DDA behavior) with respect to its operation of the LTE Protocol Stack (LTE PS), e.g. DRX control, the scheduled times for communication establishments, and may for example reduce the load on the RAN and the core network at a given location (e.g. radio cell), e.g. by partial or complete blocking of traffic caused by applications (e.g. DDAs). Non-application traffic, i.e. traffic of data that are not related to an application, e.g. data which are not generated or consumed by an application (e.g. non-DDA traffic, i.e. traffic of data that are not related to a DDA e.g. data which are not generated or consumed by a DDA) may benefit from this deviation mechanism and at a later point in time the applications may be allowed to resume with their connection set-up attempts.

For example, the following is carried out:
1) Detect a deviation from predicted traffic characteristics in the network.
2) Check in the network whether the detected deviation has an impact on previously submitted time tables (e.g. in a certain location).
3) Determine (predict) a duration of the detected deviation.
4) If there is an impact and the duration exceeds a given threshold: Send a deviation notification (DN) from the network to the mobile terminal (e.g. to each concerned mobile terminal). For this, for example, the system information (SI) broadcast method of LTE may be adjusted (in various ways) for allowing the sending of deviation notifications. Alternatively, dedicated signaling (as explained above) may also be used.
5) Upon reception of a deviation notification (DN) in the mobile terminal: Let the mobile terminal (re-)configure the LTE Protocol Stack (LTE PS) to deviate from normal (i.e. previously scheduled) application data communication behavior (e.g. DDA communication control behavior). This may for example include blocking delay tolerant traffic of one or more applications running on the mobile terminal.
6) When the deviation time is over (as for example indicated in the deviation notification) return in the mobile terminal to the normal (i.e. previously scheduled) application data communication behavior.

According to one aspect of this disclosure, system information (SI) broadcast according to LTE communication is used to distribute a deviation notification together with a (predicted) duration of the deviation in a newly introduced information element DDA-Deviation-Start to all mobile terminals in a certain region, e.g. a radio cell, e.g. having the following structure.

```
DDA-Deviation-Start ::=    SEQUENCE {
    DDA-Class              ENUMERATED {class1, class2, class3,
                           class4, ..., class8},
    Duration               ENUMERATED {m1, m5, m10, m15,
                           m30, m60, m120, m180}
}
```

The number of DDA classes (generally application classes) is arbitrarily set to eight in this example. Other values are possible. For the duration, the value "m1" for example indicates 1 minute, "m5" indicates "5 minutes", and so on.

The information element may for example be added to SIB (System Information Block)-Type 1.

For example, the information element indicates that for class 2, there should be a deviation from the schedule in accordance with the time table for 5 minutes and, for example, traffic of applications of class 2 should be blocked instead. According to one aspect of this disclosure, generally, a deviation for a certain application class for a certain duration may mean that traffic of applications of this application class should be blocked.

According to one aspect of this disclosure, when a mobile terminal receives the deviation notification it measures the time and returns, when the duration indicated in the deviation notification is over, to the previously scheduled communication behavior (without needing to be triggered to do this from the outside). It may be desirable to use this approach when the duration can be determined with a high degree of reliability on the network side and the mobile terminal is capable of measuring time with a certain degree of accuracy.

According to another aspect of this disclosure, an information element is introduced and added to the system information broadcast having the following structure

```
DDA-Deviation ::=    SEQUENCE (SIZE (1..max)) OF DDAInfo
DDA-Info ::=         SEQUENCE {
    Class            ENUMERATED {class1, class2, class3,
                     class4, ..., class8},
    Command          ENUMERATED {Start, End}
}
```

Here, max indicates the number of DDA-Info sets per DDA-Deviation. it can be less than the number of all classes available (arbitrarily set to eight in this example). DDA-Info allows Indication of start or end per DDA Class wherein "start" indicates the beginning of a deviation period and "end" indicates the resumption of normal DDA behavior.

Normal DDA behavior (or generally normal application data communication behavior) for example means the communication behavior as set by the intermediate layer 1107, 1207 in the mobile terminal based on the time table received from the network to accommodate the transmission and reception needs of the applications.

The information element may for example be added to SIB (System Information Block)-Type 1.

Using the deviation notification according to this aspect of this disclosure, start time and stop time may be indicated separately per DDA class. In other words the beginning of the deviation from normal DDA behavior and the return to the normal DDA behavior can be explicitly signaled to the mobile terminal. Accordingly, the mobile terminal does not need to measure the duration since the start of the deviation. It may be desirable to use this approach when the duration of the deviation is hard to predict on the network side.

As described above, according to one aspect of this disclosure, an application installed on a mobile terminal informs the mobile terminal about its application class or its transmission requirements. According to one aspect of this disclosure, it is checked whether an application that was installed on a mobile terminal and indicates to belong to a certain application class (e.g. DDA class) or indicates to have certain transmission requirements (e.g. DDA data transmission related requirements/properties) indeed belongs to the application class or indeed has the indicated transmission requirements. Thus, it can be avoided that, due to an application indicating a wrong class or wrong transmission requirements, the intermediate layer 1107, 1108 on the mobile terminal side applies inappropriate settings to the lower protocol layers (e.g. layers 1 to 3 of the LTE protocol stack), e.g. schedules inappropriate connection times, and the mobile terminal behaves inappropriately. For example, it may be avoided that a third party application tampers with the LTE protocol stack configuration in the scope of DDA (Diverse Data Applications).

For this, according to one aspect of this disclosure, the intermediate layer 1107, 1108 interworks with a secure processing environment (SPE). This is illustrated in FIG. 15.

Figure 15:
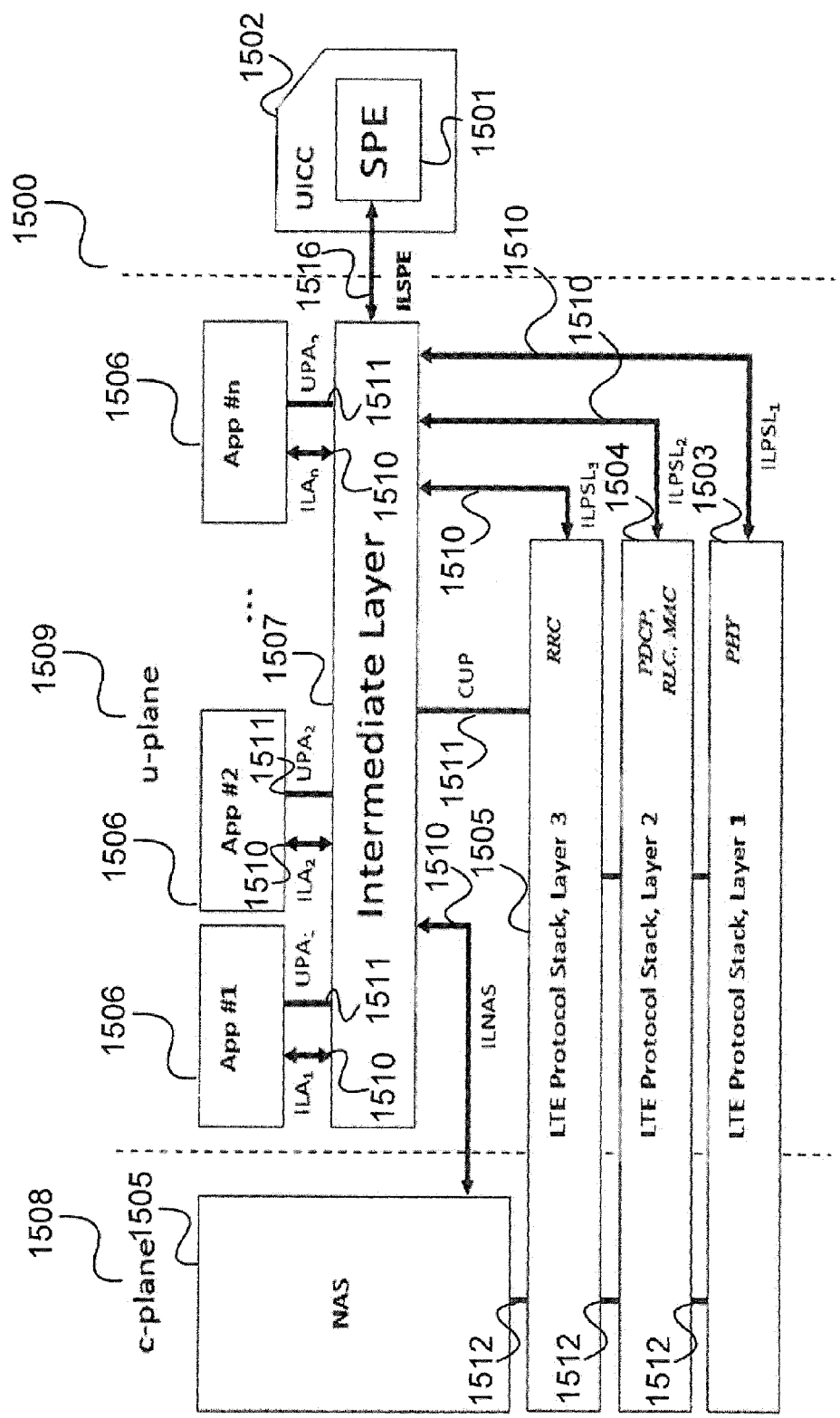
FIG. 15 shows a mobile terminal architecture according to an aspect of this disclosure.

FIG. 15 shows a mobile terminal architecture 1500 according to an aspect of this disclosure.

According to the mobile terminal architecture 1500, the mobile terminal implements a protocol stack as shown in FIG. 12, i.e. implements a layer 1 LTE protocol layer 1503 (including the PHY layer), a layer 2 LTE protocol layer 1504 (including the PDCP layer, the RLC layer and the MAC layer), a layer 3 LTE protocol layer 1505 (including the RRC layer), a mobile terminal side intermediate layer 1507, entities of the application layer 1506 corresponding to applications running on the mobile terminal and a NAS layer 1505. Between these layers, there are interfaces 1510, 1511, 1512 as explained with reference to FIG. 12.

Further, the mobile terminal includes a secure processing environment (SPE) 1501 connected to the intermediate layer 1507 via an ILSPE interface 1516 which may for example be implemented by a (for example removable) UICC (Universal Integrated Circuit Card) 1502 (or another smart card) plugged into the mobile terminal.

While mobile phones operating according to the GSM standard require a SIM card for usage in the mobile network, mobile phones operating according to the UMTS and LTE standards require a UICC with at least one USIM (Universal Subscriber Identity Module). Both type of cards (SIM Card and UICC) offer storage capability for applications and application data in their application memory. Most of these applications are typically mobile communication specific and thus are issued, maintained, and updated by the mobile network operator. Trustworthy applications may also be stored in the application memory of a smart card. This may be used for implementing the SPE 1502. The most important architecture elements of a smart card such as a UICC may be seen as:

- the application memory (e.g. an EEPROM (Electrically Erasable Programmable Read-Only Memory), e.g. used for storing applications, USAT (USIM application toolkit) applets and data (such as SMS messages, MMS messages, a phone book, etc.);
- the ROM (Read-Only Memory), e.g. used for storing the USAT, smart card applications (e.g. USIM, ISIM (IP multimedia system SIM), etc.), the file system, algorithms, the JAVA virtual machine and the operating system
- the RAM (Random Access Memory), e.g. used as working memory and for the storage of results from calculations or input/output (I/O) communications
- the Microprocessor Unit (MPU), e.g. used for the execution of instructions and
- the I/O Controller, e.g. used for the management of data blow between the mobile terminal and the microprocessor.

In a mobile communication system operating according to the GSM standard the SIM Card and the Mobile Equipment (ME) together form a Mobile Station (MS), whereas in a mobile communication system operating according to the UMTS and LTE standards the UICC (in the ROM of which multiple SIM and USIM may reside) and the mobile equipment (ME) together form a User Equipment (UE).

According to one aspect of this disclosure, the SPE 1501 is implemented by means of a trusted platform module (TPM), e.g. instead of being implemented by the UICC 1502. For this, the mobile terminal may include a trusted platform module (TPM) providing a trusted processing environment which for example is inseparably mounted on (one of) the circuit board(s) of the mobile terminal.

The trusted platform module (TPM) is an integrated circuit module that has been developed as part of the TCG specification (TCG—Trusted Computing Group, formerly known as TCPA) in order to provide a secure environment for personal computers (PCs). It resembles a smart card inseparably mounted on a computation platform. The difference to a smart card can be seen in that it is coupled to a system (computation platform) rather than to a user. Other deployment scenarios—apart from personal computers (PCs)—are PDA (personal digital assistants), cellular phones, and also consumer electronics. A TPM chip is a passive element. It cannot actively influence neither the bootstrapping process of the system nor any ongoing operation. However, it holds a unique identification tag that can be used to identify a system (computation platform) unambiguously. Furthermore, a TPM can generate, use and store a number of different keys (e.g., for encryption algorithms or digital signatures). The biggest benefit of a TPM can be seen in that these keys need not to be used outside the TPM, but all computations are done within the trusted domain of the TPM instead. Software attacks are therefore deemed impossible. Also protection from hardware attacks is relatively good (similar to secure smart cards). TPMs are manufactured in a way that physical attacks result inevitably in the destruction of all data. According to one aspect of this disclosure, the Intermediate layer 1507 in the mobile terminal takes advantage of the TPM's capabilities in terms of verification of digital signatures.

According to one aspect of this disclosure, the SPE 1501 performs a reliability (e.g. authenticity) check on information (and/or messages and commands) received from a third party application with respect to their application class or their transmission requirements. After a successful validation of the authenticity of the information received from the application the intermediate layer 1507 configures the LTE Protocol Stack (i.e. the LTE protocol layers 1501, 1502, 1503) based on the received information, e.g. taking into account a time table received from the network to reduce the number of connection establishments, enhance the utilization of resources on the air interface and save battery power in the UE.

For example, the following is carried out for an application installed on the mobile terminal:
1) Store a public key $K_{public}$ of a trustworthy authority in the SPE 1501.
2) Let the trustworthy authority digitally sign a registration message of the application with the authority's key $K_{private}$ prior to publication of the application, wherein the registration message may include application-related (e.g. DDA-related) information, such as
   an indication of the application class of the application,
   a typically expected downlink traffic characteristic,
   a typically expected UL traffic characteristic,
   an allowed delay range,
   etc.
3) Let the application provide, e.g. upon installing of the application on the mobile terminal, its signed registration message to the intermediate layer 1507 and let the intermediate layer 1507 interwork with the SPE 1501 to perform an integrity check of the application-related information, and/or validate the signature of the application-related information (i.e. of the registration message).

4) If, based on the integrity check and the validation of the signature the registration message is regarded as being authentic, allow the intermediate layer 1507 to (re-) configure the communication behavior (e.g. including configuring the LTE protocol stack) based on the application-related information.

For example, a first application (e.g. a weather application) is assumed to be successfully downloaded and installed on the mobile terminal by the user. It informs the intermediate layer 1507, e.g. after installation on the mobile terminal or during the first exchange of data with the intermediate layer 1507, e.g. with its first execution on the mobile terminal, about its transmission requirements, e.g. its application class (e.g. DDA traffic class). In this example, to allow checking of the integrity of the transmission requirements and to allow validation of the authenticity of the transmission requirements, the application is classified by a trustworthy authority before it is released or published. The timeline is illustrated in FIG. 16.

FIG. 16 shows a flow diagram 1600 according to an aspect of this disclosure.

In 1601, the application is designed and developed.

In 1602, the information about the transmission characteristics (e.g. a DDA message) is signed. For example, the information about the application class assigned to the application (e.g. "weather application" or "instant messaging client" etc.) or other DDA-related pieces of information (such as "causing sporadic UL traffic", "maximum delay tolerance of 5sec", etc.) is digitally signed by a trusted authority (with its private key $K_{private}$). The trusted authority can be for example the author of the application, a test house, the application portal owner, the MNO (Mobile Network Operator), etc.

In 1603, the application is published, e.g. on an application store. After download in 1604 and installation of the application on the mobile terminal in 1605 or when the application submits data in uplink direction for the first time to the mobile terminal in 1606 (e.g. during its first activation), the intermediate layer 1507 uses the capabilities provided by the secure processing environment 1501 to verify the integrity of the information about the transmission characteristics (for example also referred to as DDA-related information) and to validate the accompanying signature (with the authorities public key $K_{public}$) in 1607. If the SPE 1501 finds a valid digital signature, the intermediate layer 1507 has reason to believe that the information about the transmission characteristics (e.g. the DDA class) received from the application under test was created by a known and trustworthy sender, and that it was not altered during transit.

The information about the transmission characteristics of the application are for example sent to the intermediate layer 1507 via one of the ILA interfaces shown in FIG. 15, e.g. the $ILA_1$ interface in case that the application corresponds to the entity of the application layer denoted as App#1.

The information about the transmission characteristics, e.g. in form of a DDA registration message may include DDA-related information, such as the DDA class of the application, the typically expected downlink traffic characteristic of the application, the typically expected uplink traffic characteristic of the application, the allowed delay range (or separate values to indicate minimum and maximum delay), of the application etc.

In the SPE 1501 the public key $K_{public}$ of the trustworthy authority is stored. It is used to perform an integrity check on the information about the transmission requirements of the application (or parts thereof) and to validate the signature of the information about the transmission requirements (e.g. the signature of the DDA registration message). The SPE 1501 informs the intermediate layer 1507 about the outcome of these two operations. If the information about the transmission requirements of the application is not corrupted (as seen by the integrity check) and the information about the transmission requirements of the application is regarded as being authentic (as seen by the signature validation), the intermediate layer 1507 may choose to consider (i.e. take into account) this information about the transmission requirements of the application when it, in 1608, determines the configuration of the LTE protocol stack (e.g. schedules connection establishments, controls DRX, etc.), or, in other words, determines the resulting DDA (re-)configuration profile, and (re-)configures the LTE Protocol Stack of the mobile terminal accordingly.

According to another aspect of this disclosure, the intermediate layer 1507 detects the traffic characteristics of the applications installed on the mobile terminal and forwards its findings to the SPE 1501 to let the SPE 1501 determine the application classes of the applications. In this case, there is no need to perform integrity checks or to validate authenticity, assuming that the SPE 1501 itself is trustworthy (e.g. MNO controlled or certified).

According to another aspect of this disclosure, applications installed on the mobile terminal are not required to send information about their transmission characteristics (e.g. DDA registration messages) to the intermediate layer 1507 over the ILA interfaces. Instead the intermediate layer 1507 receives u-plane data from the applications via the $UPA_x$ interfaces and lets the SPE 1501, for each application, determine the application class based on the u-plane data received from this application. For this, the u-plane may be conveyed over the ILSPE interface 1516 to the SPE 1501 where the trusted operations take place, and an answer is sent back by the SPE 1501 over the ILSPE interface 1516. This answer may be of similar format as the information about transmission characteristics sent by an application (e.g. a DDA registration message sent by an application), i.e. may for example include DDA-related information, such as the DDA Class of the application, the typically expected downlink traffic characteristic of the application, the typically expected uplink traffic characteristic of the application, the allowed delay range of the application (or separate values to indicate minimum and maximum delay), etc.

While various embodiments have been particularly shown and described with reference to specific aspects, it should be understood by those skilled in the art that various changes in form and detail may be made therein without departing from the spirit and scope of various embodiments as defined by the appended claims. The scope of various embodiments is thus indicated by the appended claims and all changes which come within the meaning and range of equivalency of the claims are therefore intended to be embraced.

What is claimed is:

1. A communication terminal comprising:
one or more storage media having instructions;
one or more processors to execute the instructions to:
determine, for a software application installed on the communication terminal, a desired communication behavior of the communication terminal for an exchange of data for the software application, the desired communication behavior to include an amount of data to be transmitted or received by the software application during a certain period of time or a frequency of an occurrence of a desired transmission or reception of data for the software application, and to determine a time for the exchange of data between the communication terminal and a mobile communication network depending on the determined desired communication behavior;
determine the desired communication behavior based on information about transmission characteristics of the software application;
check at least one of the integrity and the authenticity of the information about the transmission characteristics; and
a transceiver, coupled with the one or more processors, to communicate with the mobile communication network at the determined time.

2. The communication terminal according to claim 1, wherein the one or more processors are to execute the instructions to determine the desired communication behavior based on information provided by the software application to the one or more processors.

3. The communication terminal according to claim 1, wherein the one or more processors are to execute the instructions to receive the information about the transmission characteristics of the software application from the software application.

4. The communication terminal according to claim 1, wherein the information about the transmission characteristics of the software application is an indication of an application class of the software application.

5. The communication terminal according to claim 1, wherein the transceiver is to receive, from the mobile communication network, for at least one desired communication behavior of the communication terminal, a suggested time for the exchange of data between the communication terminal and the mobile communication network and the one or more processors are to execute the instructions to determine the time for the exchange of data between the communication terminal and the mobile communication network based on the received suggested time.

6. The communication terminal according to claim 1, wherein the transceiver is to establish a communication connection to the mobile communication network at the determined time.

7. The communication terminal according to claim 1, wherein the exchange of data for the software application is the exchange of data used by the software application.

8. The communication terminal according to claim 1, wherein the exchange of data used by the software application includes at least one of the sending of data generated by the software application and the reception of data to be processed by the software application.

9. The communication terminal according to claim 1, wherein the transceiver is configured to exchange data used by the software application at the determined time.

10. The communication terminal according to claim 1, wherein the one or more processors are to execute the instructions to determine, for each of a plurality of software applications installed on the communication terminal, a desired communication behavior of the communication terminal for the exchange of data for the software application and to determine a time for the exchange of data for each of the plurality of software applications between the communication terminal and the mobile communication network depending on the determined desired communication behaviors and wherein the transceiver is to exchange data for each of the plurality of software applications with the mobile communication network at the determined time.

11. The communication terminal according to claim 1, wherein the determined time is a period of time.

12. The communication terminal according to claim 1, wherein the one or more processors are to determine a radio cell of the mobile communication network for the exchange of data between the communication terminal and the mobile communication network based on the desired communication behavior and the transceiver is to exchange data with the mobile communication network at the determined time using the determined radio cell.

13. The communication terminal according to claim 1, wherein the one or more processors are to execute the instructions to receive information about the expected load of the mobile communication network and to determine the time for the exchange of data between the communication terminal and the mobile communication network based on the information about the expected load.

14. One or more non-transitory, computer-readable media having instructions that, when executed, cause one or more components of a communication terminal to:
determine, for a software application installed on the communication terminal, a desired communication behavior of the communication terminal for an exchange of data for the software application, the desired communication behavior to include an amount of data to be transmitted or received by the software application during a certain period of time or a frequency of an occurrence of a desired transmission or reception of data for the software application;
determine the desired communication behavior based on information about transmission characteristics of the software application;
check at least one of the integrity and the authenticity of the information about the transmission characteristics;
determine a time for the exchange of data between the communication terminal and a mobile communication network depending on the determined desired communication behavior; and
facilitate communication with the mobile communication network at the determined time.

15. The one or more non-transitory, computer-readable media of claim 14, wherein the instructions are further to cause the communication terminal to determine the desired communication behavior based on information provided by the software application.

16. The one or more non-transitory, computer-readable media of claim 14, wherein the instructions are further to cause the one or more components of the communication terminal to receive the information about the transmission characteristics of the software application from the software application.

17. The one or more non-transitory, computer-readable media of claim 14, wherein the information about the transmission characteristics of the software application is an indication of an application class of the software application.

18. A communication terminal comprising:
a memory device to install applications;
one or more processors coupled to the memory device, the one or more processors to:
identify an installed one of the applications;
collect information that indicates transmission characteristics of the installed application and at least one of a data consumption characteristic of the installed application or a data generation characteristic of the installed application; and
check at least one of the integrity and the authenticity of data that is of the collected information and about said transmission characteristics;
ascertain an amount of data to be transmitted or received by a transceiver of the communication terminal during a certain period of time or a frequency of an occurrence of a desired transmission or reception of data based on the collected information; and
select a time for the exchange of data between the communication terminal and a mobile communication network based on a result of the ascertainment; and
a transceiver, coupled with the one or more processors, to communicate with the mobile communication network at the selected time.

19. The communication terminal of claim 18, wherein the selected time is a period of time.

20. The communication terminal of claim 18, wherein the transceiver is configured to exchange data used by the software application at the determined time.

* * * * *